(12) United States Patent
Khabiboulline et al.

(10) Patent No.: US 12,549,340 B2
(45) Date of Patent: Feb. 10, 2026

(54) EFFICIENT QUANTUM VOTING WITH INFORMATION-THEORETIC SECURITY

(71) Applicants: President and Fellows of Harvard College, Cambridge, MA (US); Technische Universiteit Delft, Delft (NL)

(72) Inventors: Emil Timergalievich Khabiboulline, Cambridge, MA (US); Mikhail D. Lukin, Cambridge, MA (US); Juspreet Singh Sandhu, Boston, MA (US); Johannes Borregaard, Delft (NL)

(73) Assignees: President and Fellows of Harvard College, Cambridge, MA (US); Technische Universiteit Delft, Delft (NL)

( * ) Notice: Subject to any disclaimer, the term of this patent is extended or adjusted under 35 U.S.C. 154(b) by 337 days.

(21) Appl. No.: 18/069,179

(22) Filed: Dec. 20, 2022

(65) Prior Publication Data
US 2023/0327862 A1 Oct. 12, 2023

Related U.S. Application Data

(60) Provisional application No. 63/291,698, filed on Dec. 20, 2021.

(51) Int. Cl.
*H04L 9/00* (2022.01)
*H04L 9/08* (2006.01)

(52) U.S. Cl.
CPC ...... *H04L 9/0852* (2013.01); *H04L 2209/463* (2013.01)

(58) Field of Classification Search
CPC .................. H04L 9/0852; H04L 2209/463
See application file for complete search history.

(56) References Cited

U.S. PATENT DOCUMENTS

2021/0133614 A1* 5/2021 Ashrafi ................. G02F 3/00

OTHER PUBLICATIONS

Bonanome, Marianna, et al. "Toward protocols for quantum-ensured privacy and secure voting." Physical Review A—Atomic, Molecular, and Optical Physics 84.2 (2011): 022331. (Year: 2011).*

(Continued)

*Primary Examiner* — Syed M Ahsan
(74) *Attorney, Agent, or Firm* — Alexander Akhiezer; Erik A. Huestis; Foley Hoag LLP

(57) ABSTRACT

Efficient quantum voting with information-theoretic security is provided. A tally quantum node generates a first plurality of ballot quantum states encoding a first bit string, each of the first plurality of ballot quantum states comprising a plurality of qubits. Each of the first plurality of ballot quantum states are distributed to exactly one of a plurality of voter quantum nodes via a quantum network. At least one of the plurality of voter quantum nodes: performs a projective measurement of its one of the first plurality of ballot quantum states, and thereby determining a parity of a random pair of bits of the first bit string; reads a vote; computes a first encoded vote based on the parity and vote; broadcasts the first encoded vote and an identifier of the pair of bits to each other of the plurality of voter quantum nodes. The first bit string is provided to decode the first encoded vote.

24 Claims, 12 Drawing Sheets

(56) References Cited

OTHER PUBLICATIONS

Arapinis, M., Lamprou, N., Kashefi, E., & Pappa, A. (2021). Definitions and security of quantum electronic voting. ACM Transactions on Quantum Computing, 2(1), 1-33. (Year: 2021).*

Arapinis et al., "Definitions and security of quantum electronic voting", *ACM Transactions on Quantum Computing* 2.1: 1-33 (2021).

Unnikrishnan et al., "Anonymity for practical quantum networks", *Physical review letters* 122.24: 240501 (2019).

* cited by examiner

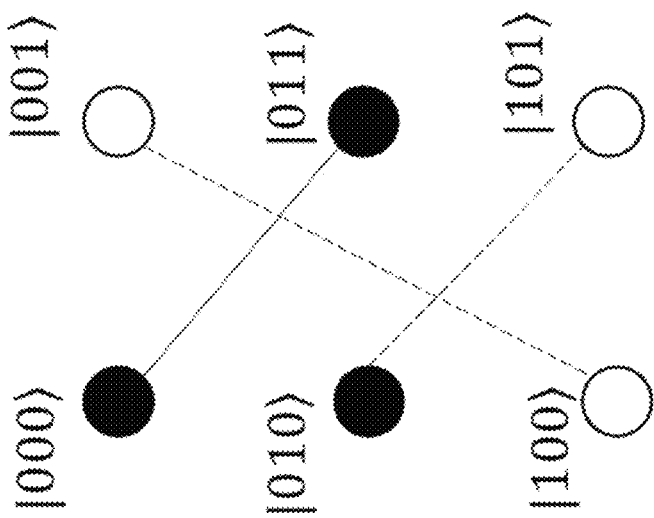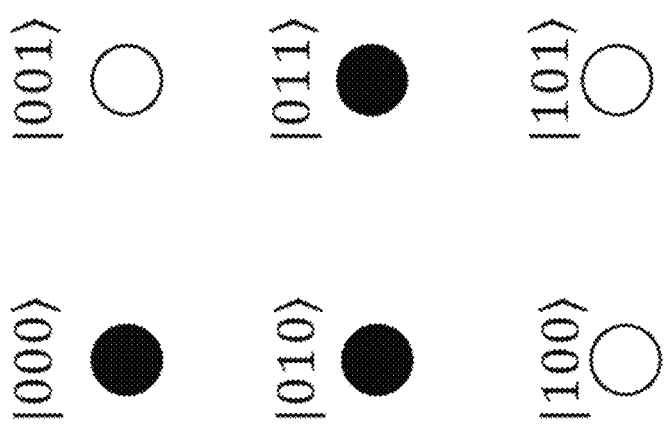
Fig. 2

Algorithm S.1: DECISION

Input: $\{c_i\}_{i=1}^N$
Output: $\text{MAJ}_N(\{v_i\}_{i=1}^N)$
Resources: $O(N^4 \log N)$ Bell pairs 1  Initialize #0=#1=0;
2  for $\ell' \in [\ell, r = O(N)]$ do
3    Run VOTING (Alg. S.3);
4    for $i \in [N]$ do
5      if $(l_i/j) \cap (l_{p_i}/p_i) = \emptyset, \forall l' < l$ then
6        if $v_{l_i} = 0$ then
7          #0 = #0 + 1;
8        else
9          #1 = #1 + 1;
10       end
11     end
12     if $p_i \neq v_{l_i} \oplus v_{j_i}$ then
13       $b_i = 1$;
14     else
15       $b_i = 0$;
16     end
17   end
18   Compute $B_{\ell'} = \sum_{i=1}^N b_i \bmod N$ (SUM);
19 end
20 Compute averages $\overline{\#0} = \#0/r$, $\overline{\#1} = \#1/r$ and margin $\overline{\#0} - \overline{\#1}$;
21 Compute average number of complaints $\sum_{\ell'} B_{\ell'}$;
22 if $|\overline{\#0} - \overline{\#1}| > 2 \sum_{\ell'} B_{\ell'}/r$ then
23   Output winner $(1 - \text{sgn}(\overline{\#0} - \overline{\#1}))/2$;
24 end

Fig. 4

Algorithm S.2: TRANSFER

Input: One qubit
Output: Qubit transmitted from $T$ to $V_{l'}$ with $\epsilon$-anonymity
Resources: $O(N^2)$ Bell pairs 1  Initialize $X = 0$;
2  while $X == 0$ do
3      $T$ shares an $(N+1)$-qubit GHZ state with voters $\{V_l\}_{l \in [N]}$;
4      for $V_l, l \in [N]$ do
5          Sample $x \xleftarrow{R} \{0,1\}^S, S = O(\log N)$;
6          Anonymously broadcasts [19] $X = \prod_{j=1}^{S} x_j$;
7      end
8      if $X == 0$ then
9          Random $V_l, l \in [N]$ runs VERIFICATION [20];
10     else
11         $\{V_l\}_{l \in [N]}$ run ANONYMOUS ENTANGLEMENT [20], establishing Bell pair $|\psi^+\rangle$ between $V_{l'}, l' \in Q([N])$ and $T$ with $\epsilon$-anonymity;
12         Quantum teleportation from $T$ to $V_{l'}$ using $|\psi^+\rangle$;
13     end
14 end

Fig. 5

Algorithm S.3: SUM

Input: $(a_i)_{i=1}^N$
Output: $a^N, a = \sum_{i=1}^N a_i \bmod N$
Resources: $O(N \log N)$ Bell pairs 1 $T$ shares $\lceil \log N \rceil$ copies of an $(N+1)$-qubit GHZ state with voters $\{V_i\}_{i \in [N]}$;
2 for $V_i, l \in [N]$ do
3     Apply $Z^{a_l}$, where $Z = \sum_{j=0}^{d-1} e^{2\pi i j/d} |j\rangle\langle j|, a_l \in \{0, \ldots, d-1\}, d = \lceil \log N \rceil$;
4 end
5 for $V_i, l \in [N]$ do
6     Apply $U_{\text{QFT}}$, where $(U_{\text{QFT}})_{ab} = (e^{2\pi i/d})^{ab}, \quad 0 \le a, b \le d-1$;
7 end
8 for $V_i, l \in [N]$ do
9     Measure $Z_l$, with outcome $k_l$;
10     Broadcast $k_l$;
11 end
12 for $V_i, l \in [N]$ do
13     Compute $\sum_{l=1}^N k_l \bmod N = \sum_{i=1}^N a_i \bmod N$;
14 end

Fig. 6

Algorithm S.4: QUEUE

Input: $N$
Output: $Q = \sigma([N]), \sigma \in S_N$
Resources: $O(N^3 \log N)$ Bell pairs 1  for $i \in [N]$ do
2     while $\sigma(i) = \emptyset$ do
3        for $V_j, l \in [N]$ do
4           $V_j$ samples $r_l \xleftarrow{R}$ Bernoulli$(1/(N-i+1))$;
5           if $l \notin Q([i-1])$ and $r_l = 1$ then
6              $b_l = 1$;
7           else
8              $b_l = 0$;
9           end
10       end
11       Compute $B^N$, $B = \sum_{l=1}^{N} b_l \bmod N$ (Alg. S.3)
12       if $B = 1$ and $r_l = 1$ then
13          $\sigma(i) = l$;
14       end
15    end
16 end

Fig. 7

Algorithm S.5: VOTING

Input: $\{v_i\}_{i=1}^N$
Output: $\{(i,j), v_i\}_{i=1}^N$ for each $V_i$
Resources: $O(N^3 \log N)$ Bell pairs 1  Anonymous queue (Alg. S.4) $Q$;
2  $T$ distributes $|\phi_x\rangle^{\otimes N}$, where $x \xleftarrow{R} \{0,1\}^n$, anonymously (Alg. S.2) to $\{V_j\}_{j \in Q}$;
3  for $V_i, l \in Q$ do
4  $\quad$ Solve $(i,j), p$ from $x$ [15];
5  $\quad$ Set agreement bit $a = p \oplus v$;
6  $\quad$ Anonymous broadcast [19] of $((i,j), a)$;
7  end
8  $T$ broadcasts $x$;
9  for $V_i, l \in [N] = \{1, \ldots, N\}$ do
10 $\quad$ Compute $v_i \equiv p_i \oplus a_i, l \in [N]$;
11 end

EFFICIENT QUANTUM VOTING WITH INFORMATION-THEORETIC SECURITY

CROSS-REFERENCE TO RELATED APPLICATIONS

This application claims the benefit of U.S. Provisional Application No. 63/291,698, filed Dec. 20, 2021, which is hereby incorporated by reference in its entirety.

GOVERNMENT SUPPORT

This invention was made with government support under 1734011 and 2012023 awarded by National Science Foundation (NSF) and under DE-SC0020115 awarded by U.S. Department of Energy (DOE). The government has certain rights in this invention.

BACKGROUND

Embodiments of the present disclosure relate to technologies for conducting votes using quantum computers, and more specifically to efficient quantum voting with information-theoretic security.

BRIEF SUMMARY

According to embodiments of the present disclosure, methods of conducting a vote using a quantum network are provided. A tally quantum node generates a first plurality of ballot quantum states encoding a first bit string, each of the first plurality of ballot quantum states comprising a plurality of qubits. Each of the first plurality of ballot quantum states are distributed to exactly one of a plurality of voter quantum nodes via a quantum network. At least one of the plurality of voter quantum nodes: performs a projective measurement of its one of the first plurality of ballot quantum states, and thereby determining a parity of a random pair of bits of the first bit string; reads a vote; computes a first encoded vote based on the parity and vote; broadcasts the first encoded vote and an identifier of the pair of bits to each other of the plurality of voter quantum nodes. The first bit string is provided to decode the first encoded vote.

According to embodiments of the present disclosure, methods of casting a vote using a quantum network are provided. A ballot quantum state is received via a quantum network, the ballot quantum state encoding a first bit string in a plurality of qubits. A projective measurement of its one of the first plurality of ballot quantum states is performed, and thereby determining a parity of a random pair of bits of the first bit string. A vote is read. A first encoded vote is computed based on the parity and vote. The first encoded vote and an identifier of the pair of bits is broadcast to each other of the plurality of voter quantum nodes.

According to embodiments of the present disclosure, methods of tallying a vote using a quantum network are provided. A plurality of encoded votes is received, each with an associated identify. Each associated identifier identifies a pair of bits randomly selected from a predetermined bit string. Each encoded vote is based on a vote and a parity, the parity being based on a projective measurement of a ballot quantum state encoding the predetermined bit string. The predetermined bit string is received. Based on the predetermined bit string and the associated identifiers, the plurality of encoded votes is decoded. The plurality of decoded votes is tallied.

According to embodiments of the present disclosure, systems for quantum voting are provided. In various embodiments, the systems comprise a quantum network; a tally quantum node operatively coupled to the quantum network; and a plurality of voter quantum nodes operatively coupled to the quantum network. The tally quantum node is configured to: generate a first plurality of ballot quantum states encoding a first bit string, each of the first plurality of ballot quantum states comprising a plurality of qubits; distribute each of the first plurality of ballot quantum states to exactly one of the plurality of voter quantum nodes via the quantum network. Each of the plurality of voter quantum nodes is configured to: perform a projective measurement of its one of the first plurality of ballot quantum states, and thereby determining a parity of a random pair of bits of the first bit string; read a vote; compute a first encoded vote based on the parity and vote; and broadcast the first encoded vote and an identifier of the pair of bits to each other of the plurality of voter quantum nodes via the quantum network.

BRIEF DESCRIPTION OF THE SEVERAL VIEWS OF THE DRAWINGS

FIG. 2 is a graph of an example ballot state.

FIG. 4 is pseudocode of an example decision function that calculates an election winner by averaging over election rounds to suppress adversarial votes.

FIG. 5 is pseudocode of an example protocol for anonymous state transfer.

FIG. 6 is pseudocode of an example protocol to compute distributed secure sums.

FIG. 7 is pseudocode of an example protocol to instantiate an anonymous queue that delegates the order in which the voters cast their vote.

FIG. 8 is pseudocode of an example protocol used by the voters to cast their votes.

DETAILED DESCRIPTION

Ensuring security and integrity of elections constitutes an important challenge with wide-ranging societal implications. Classically, security guarantees can be ensured based on computational complexity, which may be challenged by quantum computers. In some embodiments, the use of quantum networks can enable information-theoretic security for the desirable aspects of a distributed voting scheme in a resource-efficient manner. In one approach, ballot information is encoded in quantum states that enable an exponential reduction in communication complexity compared to classical communication. In addition, embodiments of the present disclosure, methods and computer program products provide an efficient and secure anonymous queuing protocol. As a result, the scheme only requires modest quantum memories with size scaling logarithmically with the number of voters. This intrinsic efficiency together with certain noise-robustness of the protocol paves the way for its physical implementation in realistic quantum networks.

Voting protocols have been studied extensively in classical cryptography and numerous classical voting protocols have been developed. To have a fair and secure voting outcome, an ideal protocol should meet the following requirements:

Correctness: With no adversary interference, the protocol correctly counts all voters.

Accountability: Only eligible voters are allowed to vote with only one vote per voter.

Verifiability: Voters should be able to verify their vote and the outcome of the election.

Anonymity: The identity of the voter cannot be compromised.

Figure 1A:
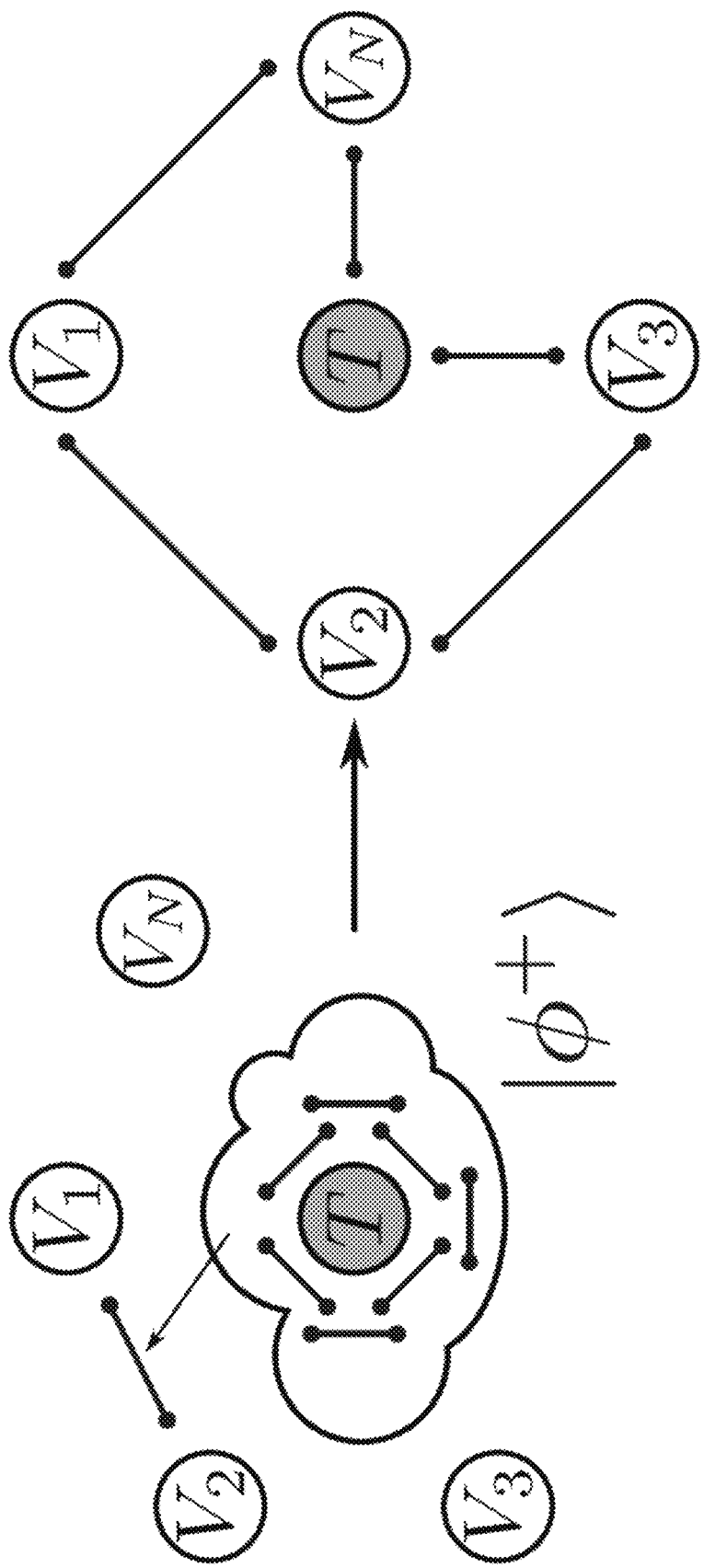
FIG. 1A is a graph of an example voting protocol where a tallyman distributes entangled pairs to voters.
Figure 1B:
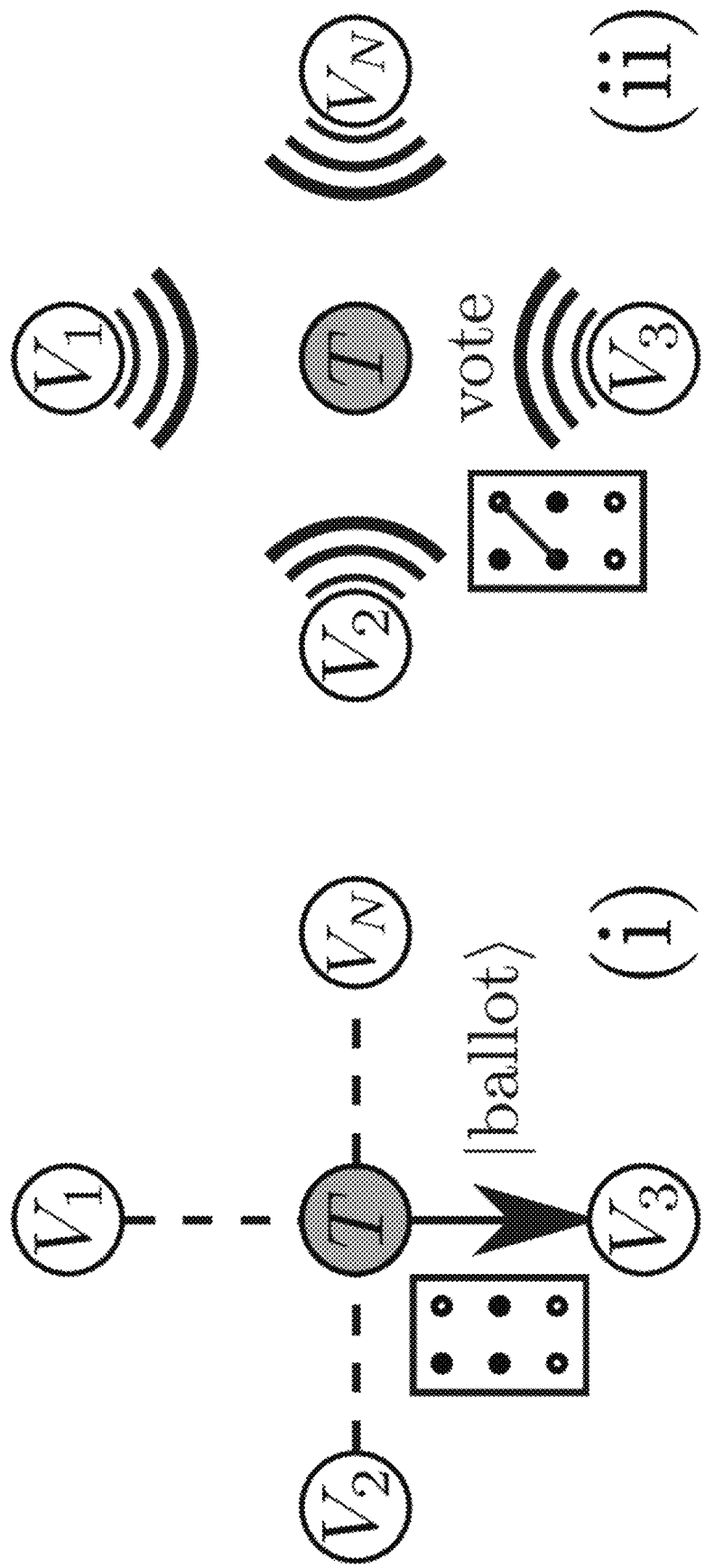
FIG. 1B is a graph of an example voting protocol where shared entanglement enables anonymous transmission of a quantum state encoding.

Referring to FIG. 1, an overview of the voting protocol according to various embodiments is provided. In FIG. 1A, a tallyman T distributes entangled pairs $|\phi^+\rangle$ to voters $V_i$, connecting themselves in a ring. In FIG. 1B, the shared entanglement enables (i) anonymous transmission of a quantum state encoding a collection of random bits (depicted as nodes of a graph) and (ii) anonymous broadcasting of votes, which are masked by a single obtained parity of two random bits (depicted as an edge on the graph).

The security of advanced voting protocols relies on assumptions about the computational complexity of certain mathematical problems, such as integer factorization. However, some of these problems can be potentially solved efficiently on future large-scale quantum computers. At the same time, quantum systems may allow the sharing of quantum information between voters that can, in principle, avoid computational assumptions in favor of information-theoretic security. Even if the encrypted information is stored, no future advances in computational power will enable its decoding. This observation has spurred active development of quantum voting protocols, see, e.g., for a recent review. However, existing approaches are either inefficient or do not satisfy all desirable security criteria. While early contributions explored the use of distributed entangled states to compute the voting function, their security is not rigorously established, especially in practical settings. For instance, quantum communication that is exponential in the number of voters is required to prevent double voting.

In this specification, a novel approach to this problem is described that exploits an exponential separation between quantum and classical communication complexity to authenticate voters and prevent forgery. The scheme features a (generally untrusted) tallyman that distributes ballots encoded in quantum states to the voters. A special encoding is used that provides an exponential reduction in communication complexity compared to classical encodings for solving a specific matching problem. This feature is related to a threshold for locally decodable codes and serves as the basis for unforgeable quantum money. The communication advantage is used to ensure efficient scaling of resources for many voters. Specifically, the total number of qubits communicated in the scheme scales polynomially with the number of voters and the size of local qubit memories scales only logarithmically with the number of voters.

Other advantages also include that the specific encoding prevents forgery of votes. More precisely, the voter can only learn enough information to output one vote, via projective measurement that collapses the quantum state encoding ballot information.

In some embodiments, the ballot state is distributed to voters via quantum teleportation using pre-shared entanglement. In the case of an untrusted tallyman, anonymous state teleportation schemes can be employed to ensure voter anonymity. Distributed computation of the voting function is enabled by anonymous broadcast of the voters' ballots and encrypted votes. To enable secure collision detection for both subroutines, a previous single-bit scheme allows computation of a distributed sum efficiently and prove its information security. It improves the efficiency of the anonymous state transfer and broadcast by queuing the senders in advance. In contrast, commonly used classical collision detection relies on pairwise authenticated channels (consuming more resources) and has not been proven secure against quantum adversaries. Note that compared to prior quantum secure summation protocols, the approach shares the output with all parties while retaining efficiency.

In some embodiments, the tallyman is required to create and teleport the ballot state to each voter using photonic channels. The voters can do permutations of the computational basis states allowing them to measure the ballot state in different bases. This can be achieved using one quantum node per voter containing a number of memory qubits that only scales logarithmically with the total number of voters. Consequently, quantum nodes with only tens of qubits are required for thousands of voters.

In some embodiments, it is assumed that the scheme has an honest majority of tallymen. It is necessary in general to achieve multiparty secure computation. In this specification, the protocol is described using perfect quantum operations. However, the security of the scheme is not broken in the presence of imperfections. In practice, given faulty operations, the scheme may need to be run more times to output the outcome without aborting.

The main result can be summarized as (formalized later in Theorem 5) the desirable cryptographic properties of a voting scheme can be satisfied for N voters with information-theoretic security with efficient scaling involving total quantum communication of $O(N^4 \log N)$ qubits and $O(\log N)$ memory qubits per voter.

The Voting Scheme

At a high level, the voting protocol consists of the following phases:

Ordering the voters anonymously in a queue.
Distribution of ballots to voters in order.
Writing up to one vote per ballot by the voters.
Collection of ballots from voters in order.
Verifying that voting ran correctly and aborting otherwise.
Counting of votes.

The first five steps are implemented with quantum algorithms. The last step is done classically. For brevity, specific steps of the voting scheme are described assuming a trusted tallyman. The voting scheme is also described based on amendments to the scheme that allow for an untrusted tallyman. Further description includes how the ballots need to be distributed anonymously and the resource cost of the voting scheme.

Creating the Quantum Ballots

In some embodiments, the protocol begins with the tallyman sampling a random bit string $x \xleftarrow{R} \{0,1\}^n$ of n bits. As discussed later, $n=O(N^2)$, where N is the number of voters, to ensure that the protocol runs correctly. For instance, n=6 and the sampled bit string is x=101100.

In some embodiments, the tallyman prepares N copies of the ballot state $$|\psi_x\rangle = \frac{1}{\sqrt{n}} \sum_{i=0}^{n-1} (-1)^{x_i} |i\rangle \quad \text{Equation 1}$$

Here, $x_i$ is the $i^{th}$ bit of x. The quantum state can be encoded across $\lceil \log n \rceil$ qubits using a binary encoding of i. Following the example of x=101100, the state $|\psi_x\rangle$ is $$\frac{1}{\sqrt{6}} (-|000\rangle + |001\rangle - |010\rangle - |011\rangle + |100\rangle + |101\rangle) \quad \text{Equation 2}$$

where $|000\rangle = |0\rangle \otimes |0\rangle \otimes |0\rangle$ denotes a three-qubit state.

In some embodiments, after creating the ballot states, the tallyman distributes one ballot state to each voter. Using quantum teleportation, only $\lceil \log n \rceil$ Bell pairs need to be shared between each voter and the tallyman due to the efficient qubit encoding of x.

Casting a Vote

In some embodiments, having received a quantum ballot state, a voter can, by means of a projective measurement, learn the parity of two random bits from the encoded bit string x. As an illustration, each of the basis states $|i\rangle$ can be viewed as nodes. Measuring in the basis $|i\rangle$ would correspond to projecting at random on one of the nodes. Instead, a voter randomly chooses another complete measurement basis consisting of projectors on superpositions of two states $$\frac{1}{\sqrt{2}} (|i\rangle \pm |j\rangle)$$

(where i≠j). This can be viewed as picking a pairwise matching of all the nodes and projecting on a single random edge of the corresponding matching (See FIG. 2). Following the above example, a measurement basis could, e.g., consist of projectors on states $$\frac{1}{\sqrt{2}} \{|000\rangle \pm |011\rangle, |001\rangle \pm |100\rangle, |010\rangle \pm |101\rangle\} \quad \text{Equation 3}$$

By this measurement, the voter learns the parity between bit $x_i$ and $x_j$ since obtaining measurement outcome $|i\rangle \pm |j\rangle$ corresponds to the parity of $x_i$ and $x_j$ being even (+) or odd (−).

Referring to FIG. 2, a graph representation of the ballot state is provided. On the left, the basis states are viewed as nodes that are either empty or filled corresponding to whether they encode a 0 or 1 bit of the bit string x. The depicted nodes correspond to the state in Equation 2. At right, the measurement performed by a voter corresponds to picking a random pairwise matching of the nodes and projecting onto one of the edges at random. The graph depicted corresponds to obtaining measurement outcome $|000\rangle + |011\rangle$ (solid line), having measured in the basis defined in Equation 3.

In some embodiments, the voter classically encodes their vote $v \in \{0,1\}$ by calculating the vote bit $a = p \oplus v$ where $\oplus$ denotes addition modulo 2. Here, the notion that even (odd) parity is assigned bit value $p=0(p=1)$ is used. More than two choices in the election can still be encoded in binary and evaluated with each bit corresponding to an independent election; for example, a third choice could be a default null vote. To compute the voting function, the voters can broadcast their measured edge (i,j) and their vote bit a as described below. Once all voters have broadcasted their masked votes, the bit string x can be revealed by the tallyman. This enables the voters to decode each other's votes having the complete information of x.

Importantly, x is not to be revealed until after all voters have cast their votes (the case of a dishonest tallyman is treated below). In this way, a correct encoding and subsequent decoding of a vote can only be guaranteed if the voter can sample the correct parity of an edge from measurement of the ballot state. In what follows, a proof is provided, that given k copies of the ballot state, a voter will only be able to obtain the parity of k distinct edges (meaning that the edges do not share a node) in a deterministic fashion. Obtaining more than k parities can only be achieved by randomly guessing a parity with a success probability of 1/2.

In some embodiments, double voting can be ruled out by repeating the voting protocol O(N) times and averaging the votes over the rounds. If any collection of k voters (having access to k ballot states) tries to output more than k votes, they can only do so by randomly guessing parities for the extra votes, which will average to an even number of 0 and 1 votes over the repetitions and will cancel upon calculating the margin of the election.

The above arguments necessitate that only votes from distinct edges are counted. Otherwise, a vote can be forged, since $x_i \oplus x_j = (x_i \oplus x_k) \oplus (x_k \oplus x_j)$. In the case that two voters share a node, only the first one broadcasted will be counted. The choice not to abort the protocol if overlapping edges appear prevents denial-of-service attacks, as detailed below, but poses the problem that two honest voters might sample overlapping edges by chance, which would result in one of the votes not being counted correctly. However, by increasing the length of the bit string n, the probability of this event can be made arbitrarily small. The number of qubits only scales as log n, implying efficient use of quantum resources.

Anonymous Queuing

In some embodiments, the broadcast of the vote bits should be anonymous to retain privacy. For this, the one-bit anonymous broadcast scheme is used repeatedly to broadcast both the edge and the agreement of a voter. The protocol assumes that the voters share a GHZ (Greenberger-Horne-Zeilinger) state. A GHZ state can be distilled from a ring of Bell pairs connecting the voters and the tallyman performing a CNOT gate followed by a measurement on the target qubit combines Bell pairs into the nodes of a GHZ state, up to local single-qubit rotations. Each GHZ state can be used to anonymously broadcast one bit of classical information. The anonymity is linked with the fidelity of the GHZ state, which can be estimated by the voters through random checks of the correlations in the state. In other words, the voters either choose to use a GHZ state for transfer or for testing. In this way, they can detect if an adversary tries to compromise anonymity, since the attempt will corrupt the correlations in the GHZ state.

One complication of the above protocol is that one ring of Bell pairs only allows a single voter to broadcast one bit. However, to cast a vote, the voters need to broadcast both the edge (i, j) of their ballot and their vote bit a, corresponding to 2 log n+1 bits of classical information. Therefore, voters need to be queued such that the order in which the bits are broadcasted is known. At the same time, collisions where two voters try to broadcast simultaneously are prevented.

Here, a position in the queue corresponds to a collection of O(N log n) Bell pairs used to broadcast the vote information of one voter. Previous works have used a classical collision detection algorithm, which relies on pairwise authenticated channels between the voters and has not been proven secure against quantum adversaries.

In some embodiments, the protocol uses an anonymous queuing algorithm. It uses a multiparty secure sum that can be viewed as a generalization of the one-bit protocol of. Assuming that the voters share entangled states of the form $$\frac{1}{\sqrt{M}}|o\rangle^{\{\otimes N\}} + \ldots + |M-1\rangle^{\{\otimes N\}}].$$ Equation 4

Here, $M=2^{\lceil \log N \rceil}$ and the above state therefore corresponds to sharing $\lceil \log N \rceil$ GHZ states between the voters. The voter broadcasting applies $Z^a$, where Z is the M-dimensional phase shift and $a \in \{0, \ldots, d-1\}$ is the announcement. Then, every voter applies the M-dimensional quantum Fourier transform on their share of the state, followed by measurement in the computational basis. If everyone announces their measurement outcome $k_l$, anyone can sum them together to obtain the announcement:

$$a = \sum_{i=1}^{N} k_l$$ Equation 5

Thus, the correlations in the GHZ state act like a key. For multiple voters inputting an announcement, a sum is computed anonymously, up to a value M. It enables collision detection in the queuing algorithm. Namely, voters attempt to enter the queue with equal probability so that on average, one voter tries to enter in a single round. To enter the queue, a voter broadcast 1 instead of 0. If the sum does not equal 1, the queuing failed because either no voters entered or several collided. Meanwhile, a sum of 1 is viewed as a success. Upon failure, the algorithm resamples. On average, the number of runs to fill the queue is O(N).

The anonymity of the queue is key to the security of the scheme. Namely, if the positions of voters is revealed, then an adversary learns which voter broadcasted a particular vote bit and edge. At the end of the election, they can check the voter's vote similar to the honest voter; see below.

Obtaining the Election Result

After being queued, the voters broadcast their encrypted votes using the one-bit anonymous broadcast scheme. Each voter now has every other voter's information but cannot decrypt it until the tallyman reveals x. With the tallyman's announcement, each voter classically computes parities and adds them to corresponding agreement bits:

$$p_i \oplus a_i = p_i \oplus (p_i \oplus v_i)$$ Equation 6

$$= v_i$$ Equation 7

The resulting votes are compiled in a function to decide the outcome of the election. In order to ensure accountability (prevent double voting), the election is repeated O(N) times, averaging the tallies. Each voter then calculates the margin, which suffices to cancel any adversarial votes and determines the winner in majority vote.

Verification of GHZ States

In order to ensure anonymity in the queuing the process, it is critical to verify that the shared states used by the voters are close to an idealized GHZ state. This requires running a verification protocol where each voter $i \in [n]$ chooses a measurement based on the realization of a random bit string $$\{X_i\}_{i=1}^{N}$$

chosen by the tallyman. If $X_i$ is 1, the voter i performs a Hadamard operation, else the voter applies a Pauli Z transformation. The post-op measurements $Y_i$ are made in the Z-basis, and accepted if an only if:

$$\sum_{i=1}^{n} Y_i = \frac{1}{2}\sum_{i=1}^{n} X_i \bmod 2.$$ Equation 8

The above procedure is repeated log(N) times, and the tallyman accepts if the test passes each time. The entire test is repeated O(N) times to ensure desirable success probability.

Anytime that voters notice deviation from the honest behavior of the protocol, they anonymously complain at the end of a round. The first trigger for a complaint is when GHZ state verification fails. Voters also choose their vote randomly, so as not to reveal the true value. Second, at the end of the voting round, voters verify that their own vote is counted correctly and not flipped due to, e.g., a corruption of their ballot state.

Complaints are filed by encoding into a secure sum, similar to what is described above, so the number of complaints per round is known. If, on average, the margin of the election is greater than twice the number of complaints, then the compromised votes would not affect the outcome and the election result holds. Otherwise, the election is aborted.

Dishonest Tallyman

The tallyman has complete knowledge of x, so they have additional power compared to the voters. Specifically, a dishonest tallyman can output extra votes and might tamper with the ballot states to compromise the anonymity of the voters. To avoid putting trust in the tallyman to behave honestly, two amendments to the voting protocol is introduced.

First, to circumvent extra votes outputted by the tallyman, the election is run in parallel with different tallymen with independent, private randomness. Each of these elections should yield the same result if the tallymen are honest, and the only assumption required is the presence of an honest majority. Any dishonest tallymen will be identified through the discrepancy in the outcome of their elections and there is thus a risk of exposure if a tallyman chooses to behave dishonestly. The independence in the randomness implies that dishonest tallymen cannot initiate attacks based on correlated randomness with honest tallymen.

Second, to ensure the anonymity of the voters, the ballot states are teleported anonymously to them. This way, the tallyman might tamper with a ballot state but will have no information about which voter received the tampered ballot. Consequently, anonymity will not be compromised.

Anonymous Transfer

To anonymously teleport the ballot states, anonymous quantum state transfer is used. Similar to anonymous broadcast, this protocol relies on shared GHZ states among the voters and the tallyman. From the GHZ state, a Bell pair is distilled between the tallyman and an anonymous voter, through which a qubit can be transferred by means of quantum teleportation. To distill a Bell pair, all but the tallyman and the receiving voter measure their qubits in the X basis and broadcast the result (the receiver broadcasts a dummy bit to stay anonymous). As before, voters periodically run a verification protocol to ensure that the GHZ state is of high fidelity, which ensures anonymity.

One GHZ state enables only a single voter to receive one qubit anonymously. The anonymous queuing of the voters (as described above) allows the voters to know in which position (comprising $O(N^2 \log n)$ Bell states) they are to receive a ballot state and to avoid collisions.

Resource Requirement

As detailed above, all subroutines of the voting protocol can be realized using shared Bell pairs between pairs of voters and the tallyman in a ring structure. The total resource consumption of one round (out of O(N) rounds) of the voting protocol is $O(N^3 \log N)$ qubits of communication.

Importantly, the size of the local qubit memories of the voters and the tallyman only scales as $O(\log N)$ assuming a sequential operation of the voting scheme where Bell pairs are distributed at the start of each subroutine (e.g., ballot distribution, anonymous queuing) instead of in advance. In this way, the size of the memories will be determined by the ballot state and the anonymous queuing algorithm, which both require $O(\log N)$ memory qubits.

The precise statements of the algorithms and technical material completing the proofs are relegated to the Supplemental Material.

Implementation

The execution of voting scheme requires an underlying quantum network capable of distributing high-fidelity Bell pairs between adjacent voters in a ring structure. In summary, the scheme consists of the steps:

First, anonymous queuing is run to establish the order of ballot distribution and vote casting. The tallyman repeatedly distributes $O(\log N)$ Bell pairs to the voters until the queuing is finished.

After the queuing, the tallyman again distributes $O(\log N)$ Bell pairs for anonymous state teleportation. Once an anonymous channel of $O(\log N)$ Bell pairs between the tallyman and a voter has been established, the tallyman creates a ballot state and teleports it to the voter.

Having received the ballot state, the voter measures in a random basis to calculate a (classical) bit used for encrypting votes.

Steps b and c are repeated until all voters have their vote bits. The tallyman now repeatedly distributes $O(\log N)$ Bell pairs to allow the voters to anonymously broadcast their encrypted votes one-by-one following the order dictated by the queue. Finally, the tallyman classically broadcasts the bit string x used for decryption.

Note that the number of Bell pairs that a voter needs to simultaneously store and operate on scales as $O(\log N)$ due to the efficient encoding of the quantum ballot. Only modestly-sized local quantum processors are thus required even for a large number of voters.

Entangled States

The distribution of high-fidelity Bell pairs is a key functionality of quantum networks. In this application of voting, they are combined into GHZ states. Implementation with nodes based on atomic qubits allows for generation of entanglement that is deterministic, as has been experimentally demonstrated. Then, the success probability does not decay with the number of voters. Furthermore, the number of necessary Bell pairs to obtain a set target GHZ fidelity was found to have an approximately linear scaling with N, for an optimized protocol. This result matches the naive expectation of O(N) loss in fidelity going from N Bell pairs to one GHZ state. The supplement includes an example using a purification protocol. The impact of noisy operations generally is to limit the maximum achievable fidelity.

The most demanding operations that have to be performed are the creation and measurements of the ballot states. These operations can be implemented using single quantum emitters strongly coupled to photonic resonators, which function as efficient spin-photon interfaces (See FIG. 3).

Ballot Creation

Figure 3A:
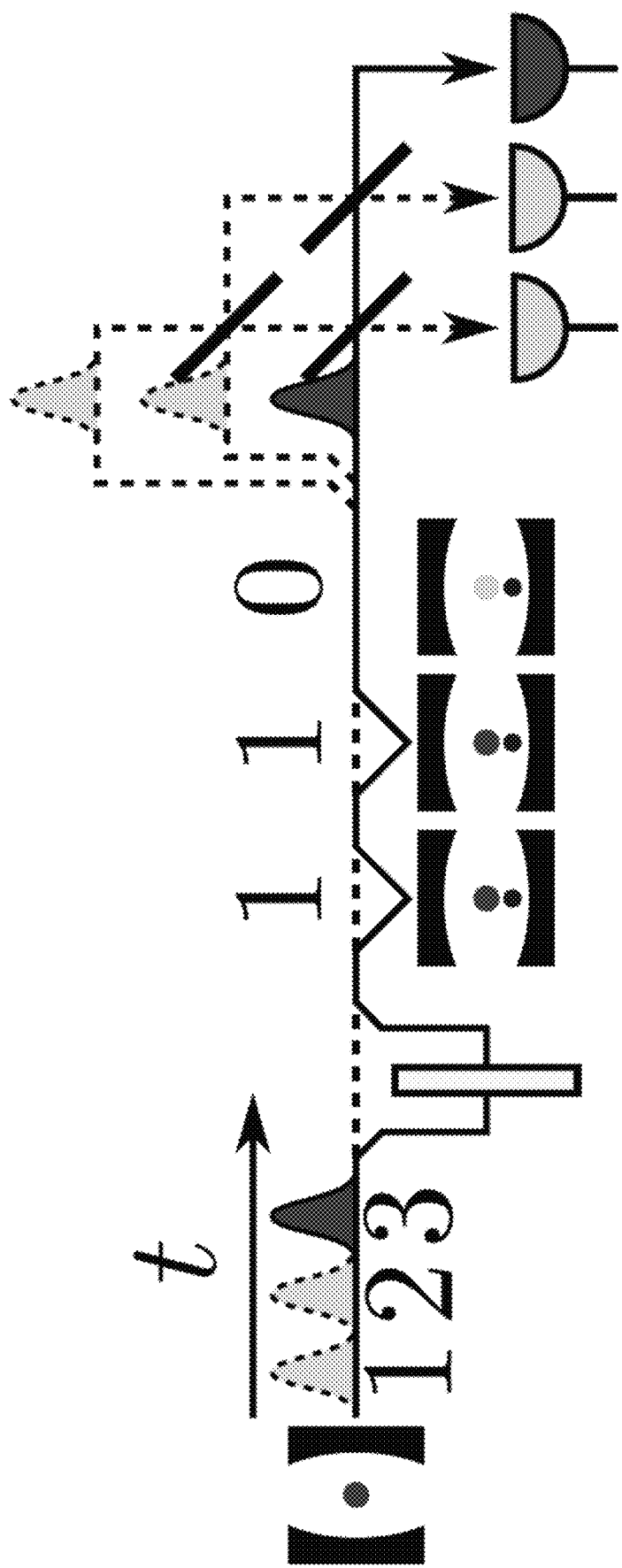
FIG. 3A is a diagram representing an example hidden matching communication problem where to create a ballot state, the tallyman first generates a single photon in a superposition of time bins.

The key idea to simplify ballot creation involves mapping between unary and binary encodings (see FIG. 3(a)). The ballot state is first encoded in unary using a qubit time-bin encoding where, ideally, a single photon is distributed equally in n time bins. Such a state can either be created using a Raman-type single-emitter scheme or approximated using weak coherent pulses. The bit string x is encoded by applying a phase of $\pi$ to photons in select time bins, e.g., by passing them through a phase shifter.

The photonic qubit is subsequently compressed into log n qubits using spin-dependent reflection from a single-sided cavity. A resonant photon will be reflected with (without) a $\pi$ phase shift if the emitter qubit is in a state that is uncoupled (coupled) to an excited state by the cavity field, which realizes a controlled-phase gate between the qubit and photon. Reflecting the photon off a logarithmic number of such emitter-cavity systems, routing time bins to cavities via the binary representation of the time bin number, will entangle the spin registers with the photonic qubit. Subsequently erasing the time-bin information with an interferometric (X-basis) measurement will teleport the ballot state to the registers up to a phase correction determined by the measurement outcome. The operation is heralded on photon detection, which mitigates the detrimental effects of loss in the system to significantly boost the fidelity. Alternatively, the erasing of the time-bin information can be achieved with atomic detection.

The coherence time of the emitter qubits will limit the size of the ballot state that can be created using the unary to binary encoding outlined above. In particular, the coherence time should be long compared to the duration of the single photon qubit pulse. Furthermore, the complexity of the final interferometric measurement also increases with the size of the qubit state since more time bins need to be interfered. The length of the qubit pulse will be n∆t, where n is the length of the bit string x and ∆t is the duration of one time-bin. The latter will be determined by the photon emission time of the emitters and the optical switching rate for routing the time bins to the cavities. For diamond defect centers, Purcell-enhanced photon emission times of about 100 would be compatible with time bins on the order of 1 ns, requiring GHz-rate optical switching. For coherence times on the order of 10 ms, this would give a limit of $n \lesssim 10^7$ compatible with thousands of voters. Note that the size of the required quantum memory would only be around 24 qubits.

Once the ballot state has been encoded in the emitter-cavity registers, it is transferred to a voter via quantum teleportation using the anonymously distributed Bell pairs. For emitters based on color centers in diamond, the Bell pair qubit may be stored in a nearby nuclear spin. A Bell measurement is performed using the direct electronic-nuclear spin coupling. The correction bit strings necessary for teleportation can be broadcast to the voter since they do not contain any information about x.

Ballot Measurement

Voters may sample log n random matchings by measuring one qubit of the ballot state in the X basis and the rest in the Z basis. The other matchings can be obtained by permuting the basis states. The X, CNOT, and Toffoli gates are universal in this sense, and the circuit size is bounded by O(n log n). In practice, sampling over all matchings may not be necessary, so smaller circuits may suffice, but then the tallyman has more influence on which edge is obtained.

Such operations can be performed with the same type of spin-cavity register as described above. To realize a CNOT gate, Bell states are first established between the spin-cavity systems using spin-photon controlled gates, similar to the ballot state creation except with a photonic time-bin qubit instead of (FIG. 3(b)). Since the ballot state has been transferred to nuclear memory qubits, the probabilistic generation of the Bell states between electronic qubits does not influence the ballot state and can be repeated until successful. Then, applying CNOT gates between the nuclear and electronic spins, measuring the electronic spins, and doing feedback on the nuclear spins results in a teleported CNOT between the nuclear spins. Spin rotations on the nuclear spins realize single-qubit gates.

Figure 3B:
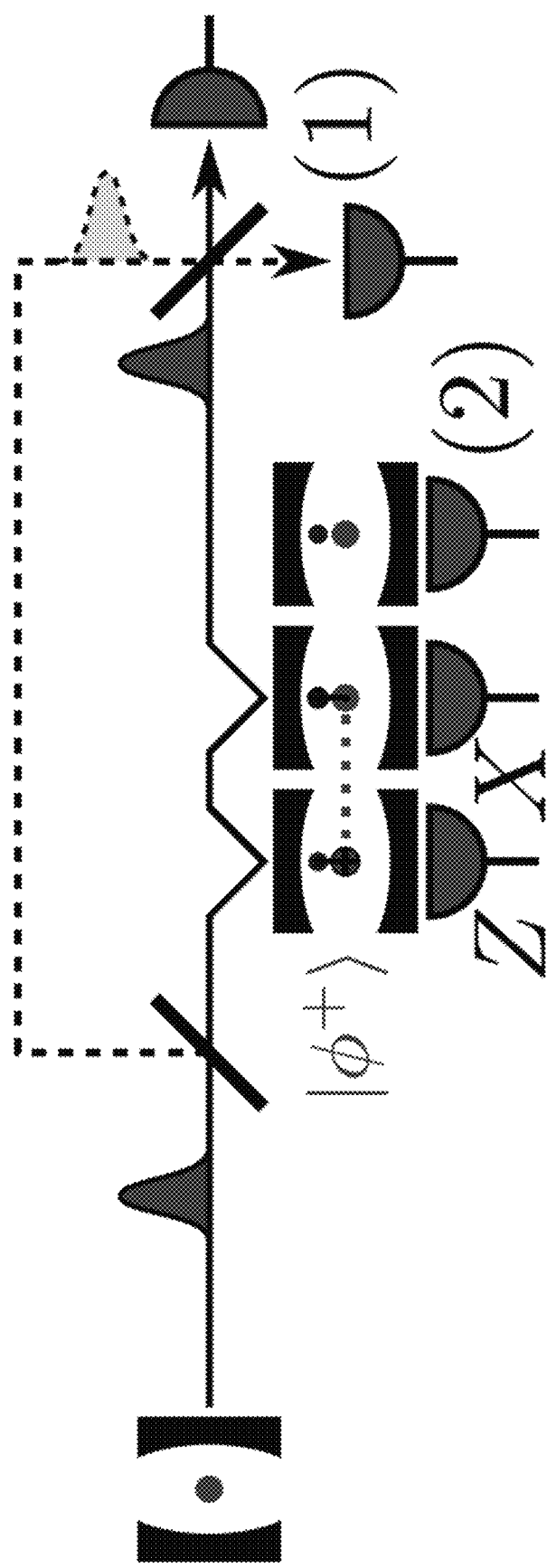
FIG. 3B is a diagram representing an example hidden matching communication problem where Bell pairs are created by reflecting a time-bin photonic qubit off two cavities, followed by measurement.

Referring to FIG. 3, implementation of the hidden matching communication problem is illustrated. In FIG. 3A, to create the ballot state, the tallyman first generates a single photon in a superposition of time bins. A time-dependent phase is applied to encode the tallyman's randomness. Teleporting to quantum memories, via cavity-assisted photonic gates followed by interferometric measurement, compresses the photonic qudit into a binary qubit code. In FIG. 3B, Bell pairs are created by reflecting a time-bin photonic qubit off two cavities, followed by measurement. This entanglement enables teleported CNOT gates, which permute basis states to sample different matchings.

Noise-Robustness

The realistic imperfect fidelity of the Bell states underlying the voting scheme reduces anonymity, but is testable so the amount of loss is known. Furthermore, the unforgeability result of the quantum ballots remains unchanged for noisy channels. Errors on the ballot state are suppressed over the rounds of the election. Any final error is detected by the voters at the end of the protocol since they verify whether their vote was counted correctly. While the vote-verification of a group of voters may fail, an election can still be carried out given that this group is small enough compared to the margin of the election.

Operations on the GHZ state should be deterministic and maintain its fidelity, to ensure favorable scaling of the scheme with number of voters. Running the election in parallel by splitting voters in communities of size O(log N), each having separate tallymen, allows for an error rate that diminishes polynomially in N and, therefore, requires only poly(N) rounds of repetition (on average) across all communities to have an effectively error-free election. Once a tally is conducted in a community, the tallymen communicate O(log N) bits to share the margin in their local election. Each tallyman can compute the outcome of the full election locally with this information. This tree structure, combined with network topologies other than a ring, may also help remove adversarial nodes that output denial-of-service (DoS) attacks.

The smaller size of sub-elections also eases the ideal operation of all voters having to participate online at the same time. In addition, voters can in principle submit their votes within some time window, and then the scheme is programmed to run at the end. Any voter that does not participate will by default submit a null vote and not object. Since the margins between choices are known, the decision whether to accept the election can be made based upon the prevalence of null votes.

EXAMPLE

To demonstrate the influence of imperfections on the scheme, a simple example with N=3 voters, using current realistic parameters can be analyzed. Assume voters share Bell pairs with fidelity $F_{Bell}$. The fidelity of the resulting GHZ state can be approximated as $F_{Bell}^N$. Under a simple, worst-case depolarizing noise model, assume quantum operations and measurements either work perfectly or completely depolarize the state with probability p. Then, the fidelity of the GHZ state is approximately $F_{GHZ}=F_{Bell}^N(1-p)^{f(N)}$, where f(N) is the total number of noisy operations. This fidelity contributes to the anonymity parameter as $$\sqrt{1 - F_{GHZ}^2}.$$

For anonymously casting a vote, where f(N)=N+1=4, p=0.01, $F_{Bell}$=0.9, the resulting anonymity leak is $\gamma \approx 0.71$, which is significant compared to ½. Even though the error model is stringent, errors rapidly lead to leaks in anonymity. Nonetheless, given imperfect Bell pairs, the number needed to achieve a target $\gamma$ is polynomial in N.

Experimental errors do not diminish the unforgeability of the quantum ballots. However, errors may lead voters to find the wrong parity p⊕1 with some probability. The influence of this bit flip is suppressed via the O(N) rounds of the protocol by a factor of $\sqrt{N}$, similar to adversarial votes. For example, consider that each gate in the ballot measurement completely depolarizes the state with probability p. Then, the averaged bit is flipped with probability $$\frac{1}{2}\left[1 - (1-p)^{N^2 \log N}\right]/\sqrt{N}.$$

If the vote is flipped at the end of the election, the voter will protest in the verification stage. For N=3, p=0.01, the probability evaluates to 0.027. See the supplement for a more detailed analysis of the bit-flip channel. Thus, errors cause the protocol to abort more often, but the correctness, accountability, and verifiability properties are unaffected.

Security Analysis

Threat Model

It can be assumed that the voters are partitioned into two sets: honest and dishonest. In the threat model, it can be assumed that the set of honest voters will follow the protocol. The same voting protocol is run by multiple tallymen, each having independent randomness, a majority of whom are assumed to be honest. No further assumptions are made, and the dishonest tallymen can collude with the set of malicious voters. Additionally, no limits are placed on the computational power of the malicious voters.

This specification provides definitions for the security properties of a voting protocol, accounting for information-theoretic security. Compared to prior work in the setting of computationally bounded adversaries, the properties presented account for the more general setting of information-theoretic security and therefore provide a stronger security guarantee. The protocol satisfies these properties; details of the proofs are in the supplement. The protocol does not leak any information as a function of the number of voters, in contrast to where the distinguishing probability is allowed to be 1/2+negl(N)—a weaker requirement where a negligible (inverse superpolynomial) amount of information can be learned.

Formally defining the desirable properties of a voting protocol introduced informally in the beginning of this article.

Definition 1 (Correctness). A voting protocol $\Pi_{vote}$ is said to satisfy the correctness property if $\forall_\epsilon \in (0,1)$, given a set of honest voters $$\{V_i\}_{i=1}^N \text{ with votes } \{v_i\}_{i=1}^N,$$

$$Pr\left[\prod_{vote}\left(\{v_i\}_{i=1}^N\right) = MAJ_N\left(\{v_i\}_{i=1}^N\right)\right] \geq 1 - \epsilon$$

Equivalently, Definition 1 asserts that the protocol outputs the correct answer in the absence of adversarial voters with probability close to unity. Theorem 1 demonstrates that voting protocol satisfies this property.

Definition 2 (Accountability). A voting protocol $\Pi_{vote}$ is said to satisfy the accountability property if $\forall \delta > 0$, $Pr$[honest votes are counted]=1 and, $Pr$[malicious votes are counted]$\leq \delta$

Definition 2 asserts that the voting protocol always counts votes output by honest voters but does not count, with high probability, votes output by any voter that is not honest. accountability demonstrates that the voting protocol satisfies this property.

Definition 3 (Verifiability). A voting protocol $\Pi_{vote}$ is said to satisfy the verifiability property if every voter $V_i$, $i \in [N]$ can check that their vote $v_i$ is tallied and any auditor can verify the outcome of the election by looking at the transcript of $\Pi_{vote}$.

Definition 3 asserts that the protocol is transparent in that it allows voters to check the tallying process. Theorem 3 demonstrates that the voting protocol satisfies this property.

Definition 4 (Anonymity). A voting protocol $\Pi_{vote}$ satisfies the anonymity property with parameter $\gamma \in (0,1)$ if the following holds: Given an honest set of voters $$\mathcal{B} \subset \{V_i\}_{i=1}^N$$

and a malicious set of voters $$\mathcal{A} = \{V_i\}_{i=1}^N \setminus \mathcal{B}$$

along with their choice of permutation $\pi: \mathcal{B} \to \mathcal{B}$, such that $|\mathcal{A}| \leq N$, $\forall$ strategies S used by $\mathcal{A}$ $$\Pr_{b \xleftarrow{R} \{0,1\}}\left[S(\prod_{vote}) = b\right] \leq \frac{1}{2} + \gamma \qquad \text{Equation 9}$$

where b is a bit that is chosen uniformly at random, such that $\Pi_{vote}$ runs for the configuration of votes chosen by $\mathcal{A}$ for b=0 and the permuted version for b=1.

Definition 4 asserts that malicious voters cannot associate a voter's identity to the vote cast by them. More precisely, anonymity is maintained when malicious voters cannot distinguish between any two voting configurations output by honest voters on observing the announcement of the honest voters regardless of the strategy that they use. Theorem 4 demonstrates that the voting protocol satisfies this property.

The following explanation describes how the voting protocol introduced in this article satisfies the requirements of an ideal voting scheme formally introduced above. First, in the presence of only honest voters, the protocol computes the correct outcome of the voting function.

Theorem 1 (Correctness). The voting protocol described in this article satisfies Definition 1.

Proof Sketch. By construction, assuming that the ballots do not have overlapping edges, the voting protocol outputs the majority winner of the election. The probability that all voters sample the parity of independent bits can be shown to be $$1 - O\left(\frac{N^2}{n}\right) \qquad \text{Equation 10}$$

from simple combinatorial considerations. To avoid collisions between voters, $n=O(N^2)$, where n is the number of random bits generated by the tallyman, which are encoded in log n qubits.

The second requirement says that no voter can cast more than one vote. Recall that votes are computed as $v=p \oplus a$, where a ballot ((i,j), p) is acquired by solving the communication problem and the agreement $a \in \{0,1\}$ is determined by the desired vote. It is proved that no voter can output more than one vote that aligns with their intended candidate deterministically, and that extra votes do not bias the election. Casting more than one vote results in all but the first vote being distributed in an unbiased binomial distribution. The influence of the other votes is suppressed by repeating the protocol.

Lemma 1. Given N copies of the ballot state $|\psi_x\rangle$, a string of $N' \geq N$ votes may be outputted with probability $$Pr[(N' - N) \text{votes}] \leq \frac{1}{2^{N'-N}} \qquad \text{Equation 11}$$

Proof Sketch. Votes are only counted if they do not have intersecting vertices. It can therefore be considered that the task of outputting the overall parity of more than 2N bits given access to N ballot states, which bounds the success probability of outputting more than N votes by reduction. The success probability of any measurement strategy can be bounded correctly to distinguish between states encoding different parities of the random bits. In particular, it is shown that all extra votes are outputted with $Pr[v_i=0]=Pr[v_i=1]=1/2$, i.e., with zero bias With an appropriate number of repetitions, using the lemma above, the protocol provides a strong degree of accountability.

Theorem 1 (Accountability). The voting protocol described in this article, on repeating $$r = O\left(N, \frac{1}{\delta}\right)$$

times with averaging of outputs, satisfies Definition 2.

Proof Sketch. The adversary can technically cast any number of votes. However, outputting extra votes will eventually lead to edge collisions, causing all but the first of their votes to be dropped. As a result, malicious voters can output no more than O(N) vote attempts in a round of the protocol. Repeating $\Pi_{vote}$ using fresh randomness over O(N) rounds and averaging the outcomes suppresses the noise introduced by the extra votes such that they cancel in the computation of the margin. The first vote, conversely, is biased and contributes to the tally.

Therefore, a ballot state enables a vote to contribute to the election's tally. Without ballot states, an adversary could remotely take the positions of absentee voters who do not participate in the election. Other advantages include less reliance on physical security and on a certain number of voters being present, since the ballot states can be made with a larger parameter than that number. In addition, the protocol does not have to abort due to double-voting, and thus is more robust.

Extending the notion of accountability, the result of the election should be verifiable by both the voters and any external auditor.

Theorem 3 (Verifiability). The voting protocol described in this article satisfies Definition 3.

Proof Sketch. After running $\Pi_{vote}$, a transcript containing the edges $(i_l, j_l)$ along with the agreement bit $a_l$ of every voter is produced. Since x is revealed after every run, a voter can verify that the vote they cast was correctly counted by checking that $(x_{i_l} \oplus x_{j_l}) \oplus a_l = v_l$. An external verifier simply runs the computation in Theorem 2 to obtain the margin, by which the election is decided.

Another critical notion is anonymity: no subset of voters can conspire to identify the votes of the remaining set of voters. Perfect anonymity amounts to only being able to randomly guess the identity of a voter; i.e., the success probability of linking a vote to a voter is 1/N. In practice, however, anonymity is reduced by a parameter γ, due to the deviation from perfect fidelity of the entangled states used in the underlying protocols for distributing the ballot states and the collection of votes. This notion of information-theoretic security allows for noisy quantum states.

Theorem 4 (Anonymity). The voting protocol described in this article satisfies Definition 4 with any parameter γ>0.

Proof Sketch. The security of the anonymous broadcast in the protocol relies on the standard reduction of quantum key distribution to the error-corrected case. The mutual information between eavesdroppers and the broadcasted messages is suppressed. The agreement bit itself is masked with the randomness of the uncompromised key. The underlying ballot state can be anonymously distributed to the voters up to a certain tolerance of fidelity given by γ. The total loss of information by broadcast and transfer can then be bounded by a union bound.

The voting protocol therefore satisfies all the desirable cryptographic properties outlined in Section I and has efficient consumption of communication resources, as summarized in Theorem 5.

Theorem 5 (Main Theorem). Given $\epsilon$, $\delta$, γ>0, voters $\{V_i\}_{i=1}^N$ with votes $\{v_i\}_{i=1}^N$, and the majority voting function $MAJ_N: \{0,1\}^N \to \{0,1\}$, where $\epsilon$ is the tolerance to tag collisions, $\delta$ is the tolerance to failure during repetition, and γ is the deviation from perfect anonymity, $\exists n = O(N^2, 1/\epsilon)$ such that, $$\Pr_{x \xleftarrow{R} \{0,1\}^n}\left[\prod_{vote}^r (x, \{V_i\}_{i=1}^N) = MAJ_N(\{v_i\}_{i=1}^N)\right] \geq 1 - \epsilon - \delta$$

where $$r = O\left(N, \frac{1}{\delta}\right)$$

is the number of rounds of $\Pi_{vote}$. The scheme satisfies the security properties specified in Definitions 1-4 with γ-anonymity using no more than $O(N^3 \log N)$ qubits of communication in $\Pi_{vote}$.

Proof Sketch. The main theorem follows from the proofs of the component theorems and the analysis of the algorithms, included in the Supplemental Material Noisy votes. Malicious voters are free to attempt to output as many extra votes as possible. However, there is a limit before losing anonymity. More specifically, in order for the anonymous broadcast to go through, the voters must use the shared Bell pairs. As described earlier, the influence of extra vote attempts is suppressed by repeating the protocol a modest number of times. While a malicious voter can input noise into the broadcast channel, this attack can be detected by the honest voter at the end of the protocol. The protocol does not guarantee counting any vote that a malicious voter may cast. In particular, any voter that attempts to deterministically output more than one vote may have none of their votes counted in the election.

DoS attacks. Using the fact that a voter does not want to compromise their identity in conjunction with Theorem 1, certain families of denial-of-service (DoS) attacks can be ruled out during any phase other than one that uses the anonymous broadcast. Any attempt will either compromise their identity, lead to extra votes that are suppressed during repetitions as shown in Theorem 2, or result in their votes being not counted. As mentioned prior, while noise injected by malicious voters during anonymous broadcast can be detected, the anonymity in the protocol disallows identifying them, leading to a vulnerability to a noise-based DoS attack.

When running $\Pi_{vote}$, any malicious voter $V_i \in \mathcal{A}$, attempting to guess an edge $e=(i',j')$ that intersects with one cast by an honest voter $V_j$, will succeed with vanishing probability (Theorem 1). On the other hand, if $V_i$ observes the broadcasted edge in the tag of an honest voter $V_j$, then $V_i$ can only cast their tag afterwards (as in the order instantiated by the anonymous queue), in which case any vote with overlapping edge is discarded during the execution of $\Pi_{vote}$. If $V_i$ has output edges $\{e'\}$ that do not intersect with those of any other voters and are not obtained from the ballot state, then these votes will be suppressed during repetition (Theorem 2). Lastly, note that if some subset of malicious voters attempts to choose an intersecting set of edges on purpose to compute parities of other edges deterministically, then those extra edges broadcasted in a tag with a vote will be dropped, since they intersect with at least one of the prior edges. In such a case, only the first vote will be counted, and subsequent votes will be dropped, which removes incentive for the malicious adversaries to try this attack. These guarantees show that any DoS attack which relies on the protocol aborting due to intersecting edges can be avoided.

In this specification, an efficient quantum voting protocol is presented that satisfies the desirable security criteria with information-theoretic security (Theorem 5). It is a distributed ballot scheme where the solution to a communication complexity problem authenticates voters and encodes their votes. It is proven that the quantum encoding prevents forgery of votes, in that only one vote can be recovered from each state. The election outcome can then be computed in a secure multiparty setting using anonymous broadcast. It is provided that a generalized protocol that enables secure sum, which can be used for unconditionally secure collision detection and queuing of voters. An election is run with $O(N^3 \log N)$ qubits of communication, repeated $O(N)$ times to achieve security. Importantly, the poly(N) scaling is efficient in the number of voters N, in contrast to previous schemes. Furthermore, the protocol requires local memories of size $O(\log N)$ qubits for each voter, ensuring that only modestly-sized quantum processors are necessary even for a large number of voters. The reduction in resources, for both communication and computation, removes a fundamental obstacle toward practicality. While beyond the reach of current quantum networks, the amount of quantum processing is modest and many of the key elements of the scheme have already been demonstrated in experiments. Consequently, this work advances the state-of-the-art in cryptography and provides a practical application for quantum networks. The quantum scheme enables capabilities beyond classical voting protocols and may provide hardware-level security.

The $O(N)$ overhead introduced by averaging to suppress adversarial votes can potentially be avoided in a tag-based scheme. The tallyman T sends $s=O(\log N)$ copies of the ballot to every voter, and unless the voter can output s parities of the string x at uniformly random locations, the vote is rejected. Then, the probability that an adversary can output votes correctly is bounded by $1/N^c$, for some $c \geq 1$. Communication resources decrease to $\tilde{O}(N^3)$ qubits at the expense of a marginal increase in randomness to $\tilde{O}(N^2)$ bits, suppressing logarithmic factors. However, since a voter makes multiple announcements to cast a single vote, the anonymity of such a protocol becomes challenging to prove in the presence of adaptive adversaries.

The voting protocol does not satisfy a property called Receipt-Freeness, which asserts that no voter should be able to prove that they voted in a certain way. Malicious adversaries can use the underlying algebraic structure of the secret key in the anonymous broadcast to learn information about how the rest of the voters voted. It can be assumed that "vote selling" may still be prevented, and that it is a modest criterion given the voting protocol's other highly desirable guarantees.

The following description includes algorithms in the quantum voting protocol and cryptographic proofs of the protocol's cryptographic properties. The following description elaborates on the algorithms used in the voting protocol. It includes the overarching voting protocol for calculating the election outcome (Algorithm S.1) and the subroutines of anonymous state transfer (Algorithm S.2) and distributed secure sum (Algorithm S.3). the description further includes the higher-level protocols for anonymously queuing the voters (Algorithm S.4) and conducting one round of voting (Algorithm S.5). The description further includes aspects of how the voting protocol runs, bounding the probability of voters sampling intersecting pairs of bits from the quantum ballot state (Lemma S.2) and the number of rounds required in the queuing algorithm (Lemma S.3). Finally, it includes noise in the distribution of the quantum ballot state (Lemma S.4) and bound the probability of a successful run under independent bit flip errors.

Restating the Security Definitions

Definition 1 (Correctness). A voting protocol $\Pi_{vote}$ is said to satisfy the correctness property if $\forall_\epsilon \in (0,1)$, given a set of honest voters $$\{V_i\}_{i=1}^N \text{ with votes } \{v_i\}_{i=1}^N$$

$$Pr\left[\prod\nolimits_{vote}\left(\{v_i\}_{i=1}^N\right) = MAJ_N\left(\{v_i\}_{i=1}^N\right)\right] \geq 1 - \epsilon$$

Definition 2 (Accountability). A voting protocol $\Pi_{vote}$ is said to satisfy the accountability property if $\forall \delta > 0$ $Pr[\text{honest votes are counted}]=1$ and, $Pr[\text{malicious votes are counted}] \leq \delta$ Definition 3 (Verifiability). A voting protocol $\Pi_{vote}$ is said to satisfy the verifiability property if every voter $V_i$, $i \in [N]$ can check that their vote $v_i$ is tallied and any auditor can verify the outcome of the election by looking at the transcript of $\Pi_{vote}$.

Definition 4 (Anonymity). A voting protocol $\Pi_{vote}$ satisfies the anonymity property with parameter $\gamma \in (0,1)$ if the following holds: Given an honest set of voters $$\mathcal{B} \subset \{V_i\}_{i=1}^N$$

and a malicious set of voters $$\mathcal{A} = \{V_i\}_{i=1}^N \setminus \mathcal{B}$$

along with their choice of permutation $\pi: \mathcal{B} \to \mathcal{B}$, such that $|\mathcal{A}| \leq N$, $\forall$ strategies S used by $\mathcal{A}$ $$\Pr_{b \xleftarrow{R} \{0,1\}}\left[S(\prod\nolimits_{vote}) = b\right] \leq \frac{1}{2} + \gamma \qquad \text{Equation S.1}$$

where b is a bit that is chosen uniformly at random, such that $\Pi_{vote}$ runs for the configuration of votes chosen by $\mathcal{A}$ for b=0 and the permuted version for b=1.

Algorithms

Decision Function. The calculation of the election winner in majority vote relies on averaging over $O(N)$ rounds to suppress adversarial votes. The margin of the election is also computed. In each round of the election, voters can anonymously complain if their vote was incorrectly counted. If the number of such complaints is less than half the margin, then the election outcome is unchanged and valid. This process is made explicit in Algorithm S.1 that is presented in FIG. 4.

Anonymous State Transfer. FIG. 5 presents the algorithm S.2 that is used for anonymous state transfer. A successful run of the protocol establishes one Bell pair between a voter $V_i$ and and tallyman T with $\epsilon$-anonymity (Lemma S.1). Testing of the entanglement limits the success probability to $O(1/N)$. Since a GHZ state can be shared with N Bell pairs, anonymous teleportation of one qubit consumes $O(N^2)$ entangled pairs.

Lemma S.1. $\forall_\epsilon > 0$, given that the distributed GHZ states have fidelity $$F \geq \sqrt{1-\epsilon^2},$$

even in the presence of malicious adversaries $\mathcal{B}$, $$Pr[\mathcal{B} \text{ guesses } V_l] \frac{1}{N} + \epsilon$$

where a voter $V_l$ and tallyman T establish a Bell pair.

Secure Sum. FIG. 6 presents algorithm S.3 that computes the distributed secure sum. It relies on the correlations in GHZ states to "mask" the inputs, and outputs their sum (modulo N). The following description provides the calculations that show the correctness of the protocol. The one-bit anonymous broadcast protocol to qubits is generalized. The initial state is $$|GHZ_d\rangle = \frac{1}{\sqrt{d}}[|0\rangle^{\otimes N} + \ldots + |d-1\rangle^{\otimes N}] \quad \text{Equation S.1}$$

$$= \frac{1}{\sqrt{d}}\sum_{j=0}^{d-1}|j\rangle^{\otimes N}. \quad \text{Equation S.3}$$

A voter applies $Z^a$, where $a \in \{0, \ldots, d-1\}$ is the announcement:

$$Z^a|GHZ_d\rangle = \frac{1}{\sqrt{d}}\sum_{j=0}^{d-1}e^{2\pi ija/d}|j\rangle^{\otimes N}. \quad \text{Equation S.4}$$

Note that the action is the same no matter which voters apply Z; only the number of applications a matters. Everyone applies $U_{QFT}$, which maps $$|j\rangle \rightarrow \frac{1}{\sqrt{d}}\sum_{k=0}^{(d-1)}e^{(2\pi ijk/d)}|k\rangle:$$

$$U_{QFT}^{\otimes N} Z^a |GHZ_d\rangle = \frac{1}{\sqrt{d}}\sum_{j=0}^{d-1}e^{2\pi ija/d}U_{QFT}^{\otimes N}|j\rangle^{\otimes N} \quad \text{Equation S.5}$$

$$= \frac{1}{\sqrt{d}}\sum_{j=0}^{d-1}e^{2\pi ija/d}(U_{QFT}^{\otimes N}|j\rangle)^{\otimes N} \quad \text{Equation S.6}$$

$$= \bigotimes_{l=1}^{N}\left(\frac{1}{\sqrt{d}}\sum_{k_l=0}^{d-1}e^{2\pi ijk_l/d}|k_l\rangle\right) \quad \text{Equation S.7}$$

$$= \frac{1}{d^{\frac{(N+1)}{2}}}\sum_{j=0}^{d-1}e^{2\pi ija/d}\sum_{k_l=0 \forall l}^{d-1}\prod_{\ell=1}^{N}e^{2\pi ijk_\ell/d}\bigotimes_{l=1}^{N}|k_l\rangle \quad \text{Equation S.8}$$

$$= \frac{1}{d^{(N+1)/2}}\sum_{j=0}^{d-1}e^{2\pi ija/d}\sum_{k_l=0 \forall l}^{d-1}e^{2\pi i/\sum_{i=1}^{N}k_l/d}\bigotimes_{l=1}^{N}|k_l\rangle \quad \text{Equation S.9}$$

$$= \frac{1}{d^{(N+1)/2}}\sum_{j,k_l=0 \forall \ell}^{d-1}e^{(2\pi ij/d)(a+\sum_{l=1}^{N}k_l)}\bigotimes_{l=1}^{N}|k_l\rangle \quad \text{Equation S.10}$$

$$= \frac{1}{d^{(N+1)/2}}\sum_{k_l=0 \forall \ell}^{d-1}\delta\left(a = \sum_{l=1}^{N}k_l\right)\bigotimes_{l=1}^{N}|k_l\rangle \quad \text{Equation S.11}$$

Everyone measures this state in the computational basis. For any measurement outcome, $$a = \sum_{l=1}^{N}k_l.$$

Thus, if everyone announces their measurement outcome $k_l$, anyone can sum them together to obtain a.

Anonymous Queuing & Voting. FIG. 7 presents algorithm S.4 that instantiates the anonymous queue that delegates the order in which the voters cast their vote. Every unqueued voter samples randomly to enter the queue with equal probability. If the bit is one, the voter casts a desire to queue themselves in the next position in the queue. This request is granted if the distributed secure sum of the bits cast by all voters is 1. The protocol need only be repeated $O(N)$ times (Lemma S.3) to queue every voter.

FIG. 8 presents algorithm S.5 is the actual protocol used by the voters to cast their votes. First, the tallyman anonymously distributes (Algorithm S.2) the hidden-matching state to every voter. Then, the voters anonymously broadcast their tags, which consist of an agreement bit as well as the indices of the measured edge, in the order instantiated by the anonymous queue (Algorithm S.4). The tallyman then broadcasts the random string and the votes are computed for every voter.

Resource Consumption. One round of the voting protocol has total quantum communication of $O(N^3 \log N)$ qubits, enumerated below.

The distributed secure sum consumes $O(N \log N)$ bits of entanglement, performed $O(N)$ times to construct the queue. An extra overhead of $O(N)$ rounds is needed to verify the quality of the GHZ states.

The quantum superposition state compresses the tallyman's n bits of randomness in log n qubits. To avoid intersecting edges between voters, $n=O(N^2)$ (Lemma S.2). Copies of the state are communicated to N voters, consuming a GHZ state per qubit (with an overhead of $O(N)$ for verifying the entanglement), which may be distributed with consumption of N Bell pairs.

The anonymous broadcast protocol requires a ring of maximally entangled states connecting the voters, consuming $O(N)$ Bell pairs per broadcasted bit. Test measurements verifying the entanglement cost $O(N)$ overhead. A single ballot and vote constitute 2 log n+1 bits.

The number of rounds, used to amplify security by removing the influence of adversarial votes, is $O(N)$ in the scheme, in contrast to comparable protocols that are susceptible to double-voting if the number of rounds is not exponential in the number of voters.

Edge Collision. The following lemma S.2 bounds the number of edges that can share an intersecting vertex between two voters given a ballot state. As a result, for $n=O(N^2)$, adversarial voters can guess $O(N)$ ballot configurations before colliding with another voter. More specifically, Lemma S.2 implies that, for any $\alpha>0$, if a single voter outputs $O(N^{1+\alpha})$ votes, the probability of a shared vertex between some pair of voters becomes $O(N^\alpha)$ which is much greater than $\in$ for sufficiently large N, and causes the protocol to almost certainly fail.

Lemma S.2. Given $n=O(N^2 \in)$, $x \xleftarrow{R} \{0,1\}^n$ and two voters V, V' with perfect matchings on n vertices $$M \xleftarrow{R} \mathcal{M}_{\frac{n}{2}}, M' \xleftarrow{R} \mathcal{M}_{\frac{n}{2}}$$

and edges $e \xleftarrow{R} M$, $e' \xleftarrow{R} M'$, the probability that they share a vertex is, $$Pr[e' \cap e \neq \phi \mid e, e'] \leq O\left(\frac{N^2}{n}\right) \leq \epsilon \qquad \text{Equation S.12}$$

Proof: Since each edge e is drawn by a voter i.i.d., $$Pr[e \leftarrow V, e' \leftarrow V'] = Pr[e \leftarrow V]Pr[e' \leftarrow V'] \qquad \text{Equation S.13}$$

The probability that two voters sample an edge with intersecting vertices is equivalent to the number of edges with a shared vertex given two matchings M, M' that are sampled independently normalized by the number of matchings. The event of a shared vertex between two voters V, V' that have sampled edges e, e' is denoted as $\mathcal{E}$. To bound it for every pair of voters, first, a union bound is applied over the number of distinct voter pairs to the event E, $$Pr\left[\bigcup_{V \neq V'} \mathcal{E}\right] \leq \sum_{V \neq V'} Pr[\mathcal{E}] \qquad \text{Equation S.14}$$

$$= \sum_{V \neq V'} Pr[e, e', \mathcal{E}] \qquad \text{Equation S.15}$$

$$= \sum_{V \neq V'} \Pr_{e \xleftarrow{R} M}[e] Pr[e', \mathcal{E} \mid e] \qquad \text{Equation S.16}$$

This is followed by use of conditional probabilities to split up the joint distribution $Pr[e, e', \mathcal{E}]$. It can be noted that, $$\Pr_{e \xleftarrow{R} M}[e] = \Pr_{e,M}[e, M] = \sum_{M \in \mathcal{M}_{\frac{a}{2}}} Pr[e \mid M] Pr[M].$$

Using the above, it can be expand as, $$Pr\left[\bigcup_{V \neq V'} \mathcal{E}\right] \leq \sum_{V \neq V'} \sum_{M \in \mathcal{M}_{\frac{n}{2}}, e \xleftarrow{R} M} Pr[e \mid M] \Pr_{M \xleftarrow{R} \mathcal{M}_{\frac{n}{2}}}[M] Pr[e', \mathcal{E} \mid e] \qquad \text{Equation S.18}$$

$$= \sum_{V \neq V'} \sum_{M \in \mathcal{M}_{\frac{n}{2}}, e \xleftarrow{R} M} Pr[e \mid M] \Pr_{M \xleftarrow{R} \mathcal{M}_{\frac{n}{2}}}[M] \qquad \text{Equation S.19}$$

$$\sum_{M' \in \mathcal{M}_{\frac{n}{2}}, e' \xleftarrow{R} M} Pr[e', \mathcal{E} \mid e, M'] \Pr_{M' \xleftarrow{R} \mathcal{M}_{\frac{n}{2}}}[M'].$$

After applying the union bound over the $$\binom{n}{2}$$

pairs, marginalizing over the sums of choosing a matching M uniformly at random, and choosing the first edge e uniformly at random from the n/2 edges in a matching M, the probability that the second edge e' is computed by choosing uniformly at random from another random matching M' has an intersecting vertex.

$$Pr\left[\bigcup_{V \neq V'} \mathcal{E}\right] \leq \frac{2\binom{N}{2}}{n} \Pr_{e' \xleftarrow{R} M'}[e', \mathcal{E} \mid e, M'] \qquad \text{Equation S.20}$$

$$\leq \frac{2\binom{N}{2}}{n}(2n-3)Pr[e' \in M']. \qquad \text{Equation S.21}$$

In the above equation, note that the number of intersecting edges e' with some fixed e are $2n-3$, and compute the probability of the intersecting edge as the fraction of matchings over $n-2$ vertices to those over n vertices (fixing some intersecting edge).

$$Pr\left[\bigcup_{V \neq V'} \mathcal{E}\right] \leq 4\binom{N}{2} \frac{m - \frac{3}{2}}{n} \frac{\left|\mathcal{M}_{\frac{s-2}{2}}\right|}{\left|\mathcal{M}_{\frac{n}{2}}\right|} \qquad \text{Equation S.22}$$

$$= 4\binom{N}{2} \frac{m - \frac{3}{2}}{n} \frac{2(n-2)!\left(\frac{n}{2}\right)!2^{\frac{n}{2}}}{n!\left(\frac{n}{2}-1\right)!2^{\frac{n}{2}}} \qquad \text{Equation S.23}$$

$$= 8\binom{N}{2} \frac{n - \frac{3}{2}}{n} \frac{\frac{n}{2}}{n(n-1)} \qquad \text{Equation S.24}$$

$$\leq 8\binom{N}{2}\frac{1}{n} \qquad \text{Equation S.25}$$

$$= O\left(\frac{N^2}{n}\right). \qquad \text{Equation S.26}$$

whereby explicitly counting the number of matchings in $$\mathcal{M}_{\frac{n-2}{2}}$$

and $$\mathcal{M}_{\frac{n}{2}},$$

and setting $n=O(N^2/\in)$ is the choice for the number of random bits that the tallyman uses to draw x.

Queue. The adaptive strategy in the anonymous queuing algorithm requires $O(N)$ rounds, resulting in the consumption of $O(N^2 \log N)$ Bell pairs overall.

Lemma S.3

$$Pr[\text{Queue terminates in } O(N) \text{ rounds}] = 1 - 1/c \qquad \text{Equation S.27}$$

for any constant c.

Proof. Let $p_i$ be the probability of successfully filling the ith spot in the queue. To succeed, out of the $N-i+1$ unqueued voters, one voter attempts to enter the queue with probability $1/(N-i+1)$ while the rest choose not to. Then, combinatorially, $$p_i = (N-i+1)\left(\frac{1}{N-i+1}\right)^1\left(1-\frac{1}{N-i+1}\right)^{(N-i+1)-1} \quad \text{Equation S.28}$$

$$= \left(1-\frac{1}{N-i+1}\right)^{N-i} \quad \text{Equation S.29}$$

$$\xrightarrow{N\to\infty} 1/e. \quad \text{Equation S.30}$$

The total time $T=t_1+\ldots+t_N$ is the sum of the times needed to fill the individual spots. Having a geometric distribution, the expected value is $E(t_i)=1/p_i$. By linearity, $$\mathbb{E}(T) = \sum_{i=1}^{N}\mathbb{E}(t_j) \quad \text{Equation S.31}$$

$$= \sum_{i=1}^{N} 1/p_i \quad \text{Equation S.32}$$

$$= \sum_{i=1}^{N}\left(\frac{N-i+1}{N-i}\right)^{N-i}+1 \quad \text{Equation S.33}$$

$$\xrightarrow{N\to\infty} N\cdot e. \quad \text{Equation S.34}$$

Markov's inequality bounds the probability of a long run time, for any $c>0$:

$$Pr[T \geq ceN] \leq 1/c \quad \text{Equation S.35}$$

Bit-Flip Errors. The effect of independent bit-flip errors on the ballot state is independent of the amount of random bits n (Lemma S.4). The expected number of repetitions so that the voters can cast valid votes is $\exp(N)$ with probability $\geq 1-\exp(-\epsilon'^2 n)$. However, note that the expected number of voters with corrupted parities when N ballot states $\{\psi\_x\}$ are distributed is $$\leq \left(\frac{1}{2}+\epsilon'\right)n.$$

If the margin of victory is greater by some constant amount, then it suffices to have far fewer rounds of repetition since the probability that the same voter has errors in their parity computation also decreases exponentially, and so every round will likely have different voters with errors. By running the election in $O(N/\log N)$ communities of size $O(\log N)$ each, only $1/\text{poly}(N)$ probability of single-qubit Pauli X errors (in every community) is incurred. Therefore, with poly(N) repetitions on expectation, an error-free run is conducted.

Lemma S.4. Given N copies of the state $|\psi x\rangle$ transferred under a bit-flip channel $X_P$ independently for every qubit and some arbitrary $\epsilon' \geq 0$, the probability that N votes are cast is $$\Pr_p[N \text{ votes}] \geq O(2^{-N}) \quad \text{Equation S.36}$$

provided that x is $\epsilon'$-balanced (has roughly equivalent 1 s and 0 s). The error channel is $$X_P: \rho \to (1-p)\rho + p(X\rho X)$$

for single-qubit density matrices $\rho$.

Proof Choose some arbitrarily small $\epsilon'>0$. #0(x) and #1(x) are defined as the number of zeroes and ones in a bit string x. Notice that a Chernoff bound implies that $$\#1(x) \in \left[\left(\frac{1}{2}-\epsilon'\right)n, \left(\frac{1}{2}+\epsilon'\right)n\right], \quad \text{Equation S.37}$$

$$\#0(x) \in \left[\left(\frac{1}{2}-\epsilon'\right)n, \left(\frac{1}{2}+\epsilon'\right)n\right],$$

with probability $\geq 1-\exp(-\epsilon'^2 n)$, which is the precise characterization of $x \xleftarrow{R} \{0,1\}^n$ being $\epsilon'$-balanced.

Fix some edge $(i,j)$ that a voter $V_i$ chooses (with probability $2/n$) and an $\epsilon'$-balanced x. Note that, even under the presence of errors, the probability that the measurement is correct is if $|i\rangle \to \}\{i'\}$ and $|j\rangle \to |j'\rangle$, such that $$(x_i'=x_i)^\wedge(x_j'=x_j))^\wedge((x_i=1\oplus x_i)^\wedge(x_j=1\oplus x_j))=1 \quad \text{Equation S.38}$$

Note that the probability of the first event in Equation S.38 is simply:

$$\left(\sum_{t=0}^{\log n} Pr[x_{i'}=x_i]Pr[d_H(x_P, x_i)=t]\right) \quad \text{Equation S.39}$$

$$\left(\sum_{t=0}^{\log n} Pr[x_{i'}=x_j]Pr[d_H(x_{j'}, x_j)=t]\right) \geq$$

$$4\left(\frac{1}{2}-\epsilon'\right)^2\left(\frac{1}{2}-\epsilon'-\frac{1}{n}\right)^2,$$

where $d_H(x, y)$ denotes the Hamming distance between strings x and y. The fact that the $X_P$ channel acts on $|i\rangle$ and $|j\rangle$ independently is used and that x is drawn uniformly at random, due to the regime of the Chernoff bound set in Equation S.37. By symmetry, $$\left(\sum_{t=0}^{\log n} Pr[x_{i'=1}\oplus x_i]Pr[d_H(x_{i'}, x_j)=t]\right) \quad \text{Equation S.40}$$

$$\left(\sum_{t=0}^{\log n} Pr[x_{j'}=1\oplus x_j]Pr[d_H(x_{j'}, x_j)=t]\right) \geq$$

$$4\left(\frac{1}{2}-\epsilon'\right)^2\left(\frac{1}{2}-\epsilon'-\frac{1}{n}\right)^2.$$

The total probability that a single voter $V_l$ measures the correct parity of an edge $(i,j)$ chosen uniformly at random from $$\mathcal{M}_{\frac{n}{2}}$$

given $$|\psi_x\rangle \xrightarrow{X_P^{\otimes \log n}} |\psi_x'\rangle \quad \text{Equation S.41}$$

is $$Pr[p_{ij} = p_{i'j'}] \geq 8\left(\frac{1}{2} - \epsilon'\right)^2 \left(\frac{1}{2} - \epsilon' - \frac{1}{n}\right)^2. \quad \text{Equation S.42}$$

Since there are N independent copies of $|\psi_x\rangle$, the probability of valid votes being cast correctly by all voters is $$Pr[N \text{ valid votes}] = \geq 2^{3N}\left(\frac{1}{2} - \epsilon'\right)^{2N}\left(\frac{1}{2} - \epsilon' - \frac{1}{n}\right)^{2N} \quad \text{Equation S.43}$$

$$= 2^{-N}(1 - 2\epsilon')^{2N}\left(1 - 2\left(\epsilon' + \frac{1}{n}\right)\right)^{2N}$$

$$= 2^{-N}(1 - 4\epsilon'N + o(1))\left(1 - 4\left(\epsilon' + \frac{1}{n}\right)N + o(1)\right)$$

$$= 2^{-N} \cdot O(1),$$

if $$\epsilon' = \frac{1}{cN},$$

for some arbitrarily large c>0.

Security Proofs

The following description includes the full security proofs for the voting protocol. First, it is proven that the unforgeability of the quantum ballot, beginning with the result for one copy of the state (Lemma S.5) and afterward in general for multiple copies (Theorem S.1). Then, the influence of adversarial votes is bound when averaging over rounds of the protocol (Theorem S.2). Finally, the anonymity of the voters is provided (Theorem S.3). Later the description further includes a variant of the voting scheme. It enables savings in quantum communication (Theorem S.4) but requires a more involved security analysis of anonymity.

Verifiability is proven directly in the main text. Correctness follows from Lemma S.2. The proof of accountability relies on the unforgeability of the quantum ballot. This result is demonstrated for one copy of the state in Lemma S.5, and then generalize the proof strategy for multiple copies in Theorem S.1. Then, Theorem S.2 shows the suppression of adversarial votes via repetition, completing the proof of accountability. To prove anonymity, it is shown that the protocol does not leak information about the voters, so that guessing a particular identity cannot be done better than random (Theorem S.3).

Unforgeability

Lemma S.5. Given one copy of $|\psi_x\rangle$, a computationally unbounded adversary Adv can output more than one parity p of an edge (i,j) with probability $$Pr[Adv \to (p,(i,j))] \leq 1/2. \quad \text{Equation S.44}$$

Proof. The success probability of outputting the parity of a subset t bits is bound and it becomes 1/2 for t>2. That is, the adversary cannot forge a vote from one copy of the state better than a coin flip. A similar approach bounds the quantum communication complexity of the problem. Here, the tallyman has $x \in \{0,1\}^n$, which is encoded in $\rho(x) = |\psi_x\rangle\langle\psi_x|$. The adversary outputs a subset of [n] of size t and the parity of the bits in that subset. Without loss of generality, the adversary's protocol consists of a measurement $\Pi_G$ to output a subset, followed by a measurement of its parity (Fact S.1). $G_+$ (or $G_-$) denote the subsets of $\{0,1\}^n$ where that parity is +(or −). The probability of distinguishing between two states $\rho_+, \rho_-$ that occur with respective probabilities $p_+, p_-$ is at most, under a positive-operator valued measure (POVM), $$\frac{1}{2} + \frac{1}{2}\|p_+\rho_+ - p_-\rho_-\|_{tr}, \quad \text{Equation S.45}$$

where the deviation from 1/2 is denoted $\epsilon_{bias}$. Here, $\|\cdot\|_{tr}$ denotes the trace norm. In this case, $$p_+ = p_- = \frac{1}{2^n}\langle\rho, 1\!\!1_G\rangle, \quad \text{Equation S.46}$$

$$\rho_+ = \frac{1}{\langle\rho, \Pi_G\rangle} \sum_{x \in G_+} \sqrt{\Pi_G}\, \rho(x)\sqrt{\Pi_G}, \quad \text{Equation S.47}$$

$$\rho_- = \frac{1}{\langle\rho, \Pi_G\rangle} \sum_{x \in G_-} \sqrt{\Pi_G}\, \rho(x)\sqrt{\Pi_G}. \quad \text{Equation S.48}$$

The bias conditioned on projecting onto G is $$\epsilon_{bias}|_G \leq \frac{1}{2}\left\|\frac{1}{2^n} \cdot \sum_{x \in G_+} \sqrt{\Pi_G} \frac{\rho(x)}{\langle\rho,\Pi_G\rangle} \sqrt{\Pi_G} - \right. \quad \text{Equation S.49}$$

$$\left. \frac{1}{2^n} \cdot \sum_{x \in G_-} \sqrt{\Pi_G} \frac{\rho(x)}{\langle\rho,\Pi_G\rangle} \sqrt{\Pi_G}\right\|_{tr},$$

$$= \frac{1}{2}\frac{1}{2^n}\left\|\sum_{x \in G_+} \rho(x|G) - \sum_{x \in G_-} \rho(x|G)\right\|_{tr}, \quad \text{Equation S.50}$$

where $x|_G$ is the projection of x onto the t elements of G. The overall bias is $$\epsilon_{bias} = \sum_G \langle\rho, \Pi_G\rangle \cdot \epsilon_{bias}|_G \quad \text{Equation S.51}$$

To cancel most of the terms for each x, pair elements in $G_+$ and $G_-$ that have the minimum Hamming distance of one. Here, $\delta_{ij}$ is the Kronecker delta function.

$$\epsilon_{bias}|_G \leq \frac{1}{2}\frac{1}{2^n}\left\|\sum_{x \in G_+} [\rho(x|G) - \rho(x|G \oplus 0^{t-1}1)]\right\|_{tr} \quad \text{Equation S.52}$$

$$= \frac{1}{2}\frac{1}{2^n}\left\|\sum_{x \in G_+}\left[\frac{1}{t}\sum_{i,j=1}^t (-1)^{x_i+x_j}|i\rangle\langle j| - \right.\right. \quad \text{Equation S.53}$$

$$\left.\left.\frac{1}{t}\sum_{i,j=1}^t (-1)^{x_i+x_j+\delta_{it}+\delta_{jt}}|i\rangle\langle j|\right]\right\|_{tr}$$

$$= \frac{1}{2}\frac{1}{2^n}\left\|\sum_{x \in G_+}\frac{1}{t}\left[\sum_{i,j=1}^t (-1)^{x_i+x_j}|i\rangle\langle t| - \sum_{i=1}^{t-1}(-1)^{x_i+x_j+\delta_{it}+\delta_{tt}}|i\rangle\langle t|\right.\right. \quad \text{Equation S.54}$$

$$\left.\left.+ \sum_{j=1}^{t-1}(-1)^{x_t+x_j}|t\rangle\langle j| - \sum_{j=1}^{t-1}(-1)^{x_t+x_j+\delta_{tt}+\delta_{jt}}|t\rangle\langle j|\right]\right\|_{tr}$$

$$= \frac{1}{2}\frac{1}{2^n}\left\|\sum_{x \in G_+}\frac{2}{t}\left[\sum_{i=1}^{t-1}(-1)^{x_i+x_t}|i\rangle\langle t| + \sum_{j=1}^{t-1}(-1)^{x_t+x_j}|t\rangle\langle j|\right]\right\|_{tr} \quad \text{Equation S.55}$$

$$= \frac{1}{2}\frac{1}{2^n}\left\|\sum_{x \in G_+}\frac{2}{t}\sum_{i=1}^{t-1}(-1)^{x_i+x_t}(|i\rangle\langle t| + |t\rangle\langle i|)\right\|_{tr}. \quad \text{Equation S.56}$$

Before proceeding, note that $\rho(x|_G) = \rho(\bar{x}|_G)$, where $\bar{x}$ is the conjugate string with all bits flipped. For t odd, the parity flips upon conjugation, so the bias is zero in this case. Thus, restrict to the case where t is even. Now, invoke cancellations between elements of $G_+$, observing that even and odd-parity substrings of length $t-2$ contribute equally, for $t>2$:

$$\epsilon_{bias}|_G \leq \frac{1}{2}\frac{1}{2^n}\frac{2}{t}\left\|\sum_{i=1}^{t-1}\sum_{x\in G^+}(-1)^{x_i+x_t}(|i\rangle\langle t|+|t\rangle\langle i|)\right\|_{tr} \quad \text{Equation S.57}$$

$$= \frac{1}{2}\frac{1}{2^n} \quad \text{Equation S.58}$$

$$\frac{2}{t} \cdot \begin{cases} \left\|\sum_{i=1}^{t-1}[2^{n-1}(2)](|i\rangle\langle t|+|t\rangle\langle i|)\right\|_{tr} \\ \left\|\sum_{i=1}^{t-1}[2^{n-1}(2\cdot\frac{1}{2}\cdot 2^{t-2}-2\cdot\frac{1}{2}\cdot 2^{t-2})](|i\rangle\langle t|+|t\rangle\langle i|)\right\|_{tr} \end{cases}$$

$$= \begin{cases} \frac{1}{2}\frac{1}{2^n}\cdot 1\cdot 2^{n-1}\||1\rangle\langle 2|+|2\rangle\langle 1|\|_{tr} & \text{if } t=2 \\ 0 & \text{if } t>2 \end{cases} \quad \text{Equation S.59}$$

$$= \begin{cases} \frac{1}{2} & \text{if } t=2 \\ 0 & \text{if } t>2 \end{cases} \quad \text{Equation S.60}$$

Thus, the optimal strategy is to choose $t=2$ for all G in the POVM, resulting in overall bias $$\epsilon_{bias} = \sum_G \langle \rho, \Pi_G \rangle \cdot \epsilon_{bias}|_G \quad \text{Equation S.61}$$

$$= \frac{1}{2}\sum_G \langle \rho, \Pi_G \rangle \quad \text{Equation S.62}$$

$$= \frac{1}{2}, \quad \text{Equation S.63}$$

since $\Sigma_G \Pi_G = \mathbb{1}$ and $\rho$ is a normalized density matrix. That is, only one vote (parity and edge) can be outputted deterministically. Otherwise, success is due to guessing:

$$Pr[Adv \to (p,(i,j))] = \frac{1}{2} + \epsilon_{bias} = \frac{1}{2}. \quad \text{Equation S.64}$$

Fact S.1. For an arbitrary POVM $\Pi = \{\Pi_{a,b}\}$ indexed by $a \in \mathcal{A}$, $b \in \mathcal{B}$, one can construct POVMs $$P = \{P_a\}_{a \in \mathcal{A}} \text{ and } Q_a = \{Q_{a,b}\}_{b \in \mathcal{B}} \text{ for } a \in \mathcal{A}, \quad \text{Equation S.65}$$

such that for any state $\rho$ that $\Pi$ acts on, applying P, followed by $Q_a$, where $a$ is the outcome of P, gives the same output distribution. In particular, $$P_a = \sum_{b \in \mathcal{B}} \Pi_{a,b} \text{ and } Q_{a,b} = \sqrt{P_a^+} \Pi_{a,b} \sqrt{P_a^+}, \quad \text{Equation S.66}$$

where $$P_a^+$$

is the Moore-Penrose pseudoinverse of $P_a$. In this case, $\mathcal{A} = \{G | G \subset [n], |G| = t\}$ and $\mathcal{B} = \{+, -\}$.

Theorem S.1. Given N copies of the ballot state $|\psi_x\rangle$, a computationally unbounded adversary Adv can output a string of $N' \geq N$ parities $p_l$ of edges $(i_l, j_l)$, with probability $$Pr\left[Adv \to \{p_l, (i_l, j_l)\}_{l=1}^{N'-N}\right] \leq \frac{1}{2^{N'-N}} \quad \text{Equation S.67}$$

Proof. Given N copies of the state $|\psi_x \sigma\rangle$, the adversary cannot output successful forgeries, with probability more than coin flips. To do so, it is generalized that the calculation of the bias in Lemma S.5. Here, the projection is onto a subset G of $[n]^N$. Exploiting a data-processing inequality (Fact S.2), let G' be the union of the N subsets.

$$\epsilon_{bias}|_G \leq \frac{1}{2}\frac{1}{2^n}\left\|\sum_{x\in G'_+}\rho(x|_{G'})^{\otimes N} - \sum_{x\in G'_-}\rho(x|_{G'})^{\otimes N}\right\|_{tr} \quad \text{Equation S.68}$$

$$= \frac{1}{2}\left\|\frac{1}{2^n}\sum_{x\in G'_+}\left[\rho(x|_{G'})^{\otimes N} - \rho(x|_{G'} \bigoplus 0^{t-1}1)^{\otimes N}\right]\right\|_{tr} \quad \text{Equation S.69}$$

$$= \frac{1}{2}\left\|\frac{1}{2^n}\sum_{x\in G'_+}\frac{2}{t^N}\sum_\alpha \sum_{i_\alpha, j_\alpha \neq t}(-1)^{\Sigma_\alpha(x_{i_\alpha}+x_{j_\alpha})+x_t}|i_\alpha\rangle\langle j_\alpha|\right\|_{tr} \quad \text{Equation S.70}$$

$$= \frac{1}{2}\left\|\frac{1}{2^n}\frac{1}{t^N}\left[\sum_{x\in G'_+}\sum_\alpha \sum_{i_\alpha, j_\alpha \neq t}(-1)^{\Sigma_\alpha(x_{i_\alpha}+x_{j_\alpha})+x_t}|i_\alpha\rangle\langle j_\alpha| - \sum_{x\in G'_-}\sum_\alpha \sum_{i_\alpha, j_\alpha \neq t}(-1)^{\Sigma_\alpha(x_{i_\alpha}+x_{j_\alpha})+x_t}|i_\alpha\rangle\langle j_\alpha|\right]\right\|_{tr} \quad \text{Equation S.71}$$

$$= \frac{1}{2}\left\|\frac{1}{2^n}\frac{1}{t^N}\left[\sum_{x\in G'_+}\sum_\beta \sum_{i_\beta, j_\beta}(-1)^{\Sigma_{i=1}^t x_i}|i_\beta\rangle\langle j_\beta| - \sum_{x\in G'_-}\sum_\beta \sum_{i_\beta, j_\beta}(-1)^{\Sigma_{i=1}^t x_i}|i_\beta\rangle\langle j_\beta|\right]\right\|_{tr} \quad \text{Equation S.72}$$

$$= \frac{1}{2}\left\|\frac{1}{2^n}\sum_x \frac{1}{t^N}\sum_\beta \sum_{i_\beta, j_\beta}|i_\beta\rangle\langle j_\beta|\right\|_{tr} \quad \text{Equation S.73}$$

$$= \frac{1}{2}\left\|\frac{1}{t^N}\sum_\beta \sum_{i_\beta, j_\beta}|i_\beta\rangle\langle j_\beta|\right\|_{tr}. \quad \text{Equation S.74}$$

In Equation S.70 is the difference for each $$x \in G'_+$$

flipping $x_t$, due to complete interference of phases: $|i_\alpha\rangle\langle j_\alpha|$ denote the tensor product of basis states, with an odd number of t substitutions; $a$ indexes all such tuples. Crucially, $c \cdot x_t$ mod $2 = x_t$ for any odd c. The bit is flipped back in Equation S.71. Inducting the procedure over all bits $x_i$ yields Equation S.72: $|i_\beta\rangle\langle j_\beta|$ is composed of a tensor product of an odd number of each basis vector; $\beta$ indexes all such tuples. For clarity, $$|i_a\rangle\langle j_a| = |j_1\rangle \ldots |i_N\rangle\langle j_1| \ldots \langle j_N| \text{ s.t. } |\{i_a - t\}| + |\{j_a - t\}| - c \text{ for } c/2 - 1, \quad \text{Equation S.75}$$

$$|i_\beta\rangle\langle j_\beta| = |i_1\rangle \ldots |i_N\rangle\langle j_1| \ldots \langle j_N| \text{ s.t. } |\{i_b - i\}| + |\{j_b - i\}| - c_i \text{ for } c_i/2 - 1, \quad \text{Equation S.77}$$

$$\forall i_{a_l}, j_{a_l}, i_{b_l}, j_{b_l} \in \{1, \ldots, i\}. \quad \text{Equation S.77}$$

The constraint dictates which terms appear in Equation S.74 imposing $$e_{bias}|_G = 0 \text{ if } N < t/2. \qquad \text{Equation S.78}$$

In the voting scheme, a valid vote consists of an edge (i,j) and the parity of its bits $p_{i,j}$. The overall bias is $$\epsilon_{bias} = \sum_G \langle \rho, \prod_G \rangle \cdot \epsilon_{bias}|_G \leq \frac{1}{2}, \qquad \text{Equation S.79}$$

achieved by the ideal protocol. By reduction (Lemma S.6), a maximum of N votes can be outputted with unity success probability; outputting any more (i.e., a forgery) can only be done through guessing (Equation S.78).

Fact S.2. For any Hermitian operator R and any sub normalized POVM $\{P_a\}_a$, $$\sum_a \|\sqrt{P_a} R \sqrt{P_a}\|_{tr} \leq \|R\|_{tr}. \qquad \text{Equation S.80}$$

Lemma S.6. Evaluating the parity of t bits reduces to the evaluation of t/2 pair-wise parities (assuming t even).
Proof. Exploiting associativity of the parity function, $$\bigoplus_{i=1}^{t} x_i = \bigoplus_{j=1}^{t/2} (x_j \oplus x_{j+1}), \qquad \text{Equation S.81}$$

where $x_i \mapsto x_j$ is any permutation of the bits.
Security Amplification

Theorem S.2. $\forall \delta' >$, given=O(N) repetitions of $\Pi_{vote}$, Pr[N'>N votes are counted]$\leq \delta'$
Proof. Generic ballots cast have N'>N votes, where N copies of $|\psi_x\rangle$ are distributed. The combined ballots look like $$\{((i_1,j_1),a_{i_1,j_1}),\ldots,((i_N,j_N),a_{i_N,j_N})\} \subset |n|^2 \times \{0,1\}.$$

Theorem S.1 implies that the N'−N adversarial votes align in the desired direction with probability 1/2 each. To avoid collisions between voters and proceed with the protocol, N'−N≤O(N), by Lemma S.2. The following tail bound applies to the votes.

Lemma S.7 (Additive Chernoff Bound). For $$X = \sum_{i=1}^{n} X_i,$$

where $X_i$ are independent, identically distributed Bernoulli random variables, taking the value 1 with probability p and 0 otherwise, $$Pr[|X - E[X]| \geq \sqrt{n}\delta] \leq 2e^{-2\delta^2}. \qquad \text{Equation S.83}$$

The influence of the adversarial votes is suppressed by averaging. All votes are counted in one round of the protocol, and the average over r rounds is taken for both the 0 and 1 votes (Algorithm S.1). By linearity, consider the adversarial votes separately. Denote by X the total number of adversarial 0 votes (or 1, by symmetry, since the adversary cannot bias the output):

$$X = \sum_{i=1}^{r} \sum_{j=1}^{\eta_i} x_{ij}, \qquad \text{Equation S.84}$$

where $x_{ij}$ corresponds to round i and vote j in that round, out of $\eta_i$ votes. By Equation S.83, the influence of the adversary is bounded by $$Pr[|X - r\eta/2| \geq \sqrt{r\eta}\delta] \leq 2e^{-2\delta^2}, \qquad \text{Equation S.85}$$

where $$\eta = \max_i \eta_i.$$

Dividing by r to take the average over the rounds yields $$Pr\left[|\bar{X} - \eta/2| \geq \sqrt{\frac{\eta}{r}}\delta\right] \leq 2e^{-2\delta^2}, \qquad \text{Equation S.86}$$

where $\bar{X} = X/r$. To limit the absolute deviation to be less than 1 with high probability, set r=η=O(N), since a maximum of O(N) adversarial votes can be inputted into one round. More explicitly, for a deviation of c, the number of rounds of averaging is $r = \eta/c^2$.

To compute the margin of the election, subtract the average number of 0 votes from the average number of 1 votes. Since the adversarial 0 or 1 votes are symmetric and both represented by X, their average values cancel within an additive factor 2c=O(1). In majority rule, the election is decided by the sign of the margin. Note further, that in order to estimate the number of 0 and 1 votes, which is necessary to compute a transitive voting function $f_{vote}$ (Definition S.5), this technique only works under the assumption that every voter casts a vote.
Anonymity Reduction from Passive to Active Adversaries. In the Boykin attack model, it is assumed that the voters that are part of the ring are honest in that they carry out broadcast protocol operations. However, given that there are some subset of malicious voters, stronger model is preferred where a malicious voter $W_i$ can apply any unitary operation $U_{W_i}$ to the broadcast input state |x⟩. This requires us to amend the attack model of Boykin to allow malicious voters. This amounts to introducing a buffer voter and reasoning about the boundary around an honest voter where the incoming state may be arbitrarily tampered with.

Lemma S.8 (Buffer Voters Scramble Maximally). For any input qubit state ρ, given a buffer voter $V_{i'}$ for every voter $V_i$ (honest and malicious), the output state after the voter is I/2. Proof. Since the buffer voter $V_{i'}$ is honest, they follow the protocol and apply the quantum one-time pad to the input qubit sent from the adversary. The resulting state is $X^{i'}(Z^{j'}\rho Z^{j'})X^{i'}$. The voter is also honest and after their application, the state is $X^i(Z^j(X^{i'}(Z^{j'}\rho Z^{j'})X^{i'})Z^j)X^i$. It is sent to the adversary. Since i',j' are kept private, by the quantum one-time pad, the state to them is uninformative: $X^i(Z^j(I/2)Z^j)X^i = I/2$. Note that the voter can still use i to encrypt their broadcasted bit.

Lemma S.9 (Quantum One-Time Pad). Given $i,j \xleftarrow{R} \{0,1\}$, $X^i(Z^j\rho Z^j)X^i = I/2$, for any single-qubit density matrix ρ.

Theorem S.3. The voting protocol is γ-anonymous with fidelity $\sqrt{1-\gamma^2}$ of the GHZ states used in Algorithm S.2. Proof. In key generation, the X basis measurements do not leak information about the key values i,j. Specifically, $$X = U_{QFT}^\dagger Z U_{QFT},$$

where Z is the computational basis and the quantum Fourier transform matrix is specified by $$(U_{QFT})_{ab} = (e^{2\pi i/N})^{ab}, 0 \leq a, b \leq N-1 \qquad \text{Equation S.87}$$

X and Z are mutually unbiased bases, so they satisfy the following entropic uncertainty relation $$H(X) + H(Z) \geq \log N. \qquad \text{Equation S.88}$$

The Shannon entropy $H(Z)$ is 0 after Z measurement, so $H(X) = \log N$ is maximal; i.e., the measurement outcomes X are uniformly distributed and uninformative. Eavesdroppers are detected via testing. The security analysis of the anonymous broadcast protocol applies. Specifically, $$I(E; F(M)|A) \leq (4 + 4\sqrt{2}) H(F(K)) \sqrt{1 - F_{min}}, \qquad \text{Equation S.88}$$

where the mutual information between the eavesdroppers E and a function of the message F(M), conditioned on the announcement A, is bounded by the entropy of the function on the key K. Notably, if the fidelity of the test measurements is large enough for errors to be correctable by a code, the eavesdropper's information goes to zero.

Since voters can detect eavesdroppers and abort, the protocol is restricted to the case where a key was successfully generated and show that the distributions of every single voter under announcements in the distributed sum or broadcast are the same. Let $\mathcal{A}$ represent the subset of malicious voters. The malicious voters $\mathcal{A}$ set a voting configuration $\{v_1, \ldots, v_N\}$ for all the voters and choose a permutation over the honest voters $\pi: \mathcal{B} \to \mathcal{B}$ to permute their votes. For simplicity, assume that the voting function is transitive (Definition S.5), i.e., it only depends on the number of 0 and 1 votes. This class includes majority vote via a decision on the margin. Also assume a binary alphabet but note that more than two inputs can still be encoded in a bit string.

Definition S.5. (Transitive Voting Function). The voting function $f_{vote}: \{0,1\}^N \to \{0,1\}$ is said to be transitive if $$f^{vote}(v_1, \ldots, v_N) = f_{vote}(\pi(v_1, \ldots, v_N)), \forall \pi \in S_N, \qquad \text{Equation S.90}$$

where $v_i \in \{0,1\}$, $i \in [N] \equiv \{1, \ldots, N\}$ are the votes and $S_N$ is the symmetric group on N letters. Consider the two cases to be distinguished in the anonymity game.

b=0

The voters vote in the configuration set by $\mathcal{A}$. Voter $V_i$ announces $A_i = k_i + c_i \mod N$ where $k_i \xleftarrow{R} \{0, \ldots, N-1\}$ and $c_i \in \{0, \ldots, N-1\}$. By injectivity, the probability distributions are the same:

$$P(A_i) = P(k_i). \qquad \text{Equation S.91}$$

The distribution of the announcements of the honest voters is then uniform:

$$(A_1, \ldots, A_{|\mathcal{B}|}) \xleftarrow{R} \mathcal{U}_{\{0, N-1\}}^{\otimes |\mathcal{B}|}. \qquad \text{Equation S.92}$$

b=1

The votes are exchanged by the chosen permutation $\pi$. Note that since $f_{vote}$ is transitive, applying $\pi$ on the honest voters does not change the outcome of the election and, therefore, the adversary gains nothing by observing the outcome of the election as $f_{vote}(v_1, \ldots, v_N) = f_{vote}(\pi(v_1, \ldots, v_N))$.

Note that the permutation $\pi: i \to j$ does not change the distribution of the announcement $A_i = k_i + c_j \mod N$:

$$P(A_i) = P(k_i). \qquad \text{Equation S.93}$$

The announcements are then sampled uniformly at random:

$$(A_{\pi(1)}, \ldots, A_{\pi(|\mathcal{B}|)}) \xleftarrow{R} \mathcal{U}_{\{0, N-1\}}^{\otimes |\mathcal{B}|}. \qquad \text{Equation S.94}$$

The distributions of the announcements $A_i$, $A_{\pi(i)}$ of every voter $V_i$ are the same for every permutation $\pi$. Given that $Pr[b=0] = Pr[b=1]$, there is no bias between the two cases, by Equation S.45. Therefore, the adversary can do no better than flipping a coin.

Further, note that every honest voter $V_i$ chooses an edge et independently and uniformly at random from a random matching $$M_{\frac{n}{2}}.$$

Therefore, every honest voter's announcement is independent and there is no adaptive strategy that $\mathcal{A}$ can use to predict some information of an upcoming announcement, assuming Equation S.89 and the distributional equivalence implied by the cases. This means that the total information gained by the adversary is simply the sum of the information gained from each announcement, which is shown to be 0 above because of indistinguishability (Equation S.92 and Equation S.94). This argument also shows where the hidden matching state $|\psi_x\rangle$ assists in the protocol $\sqrt{}_{vote}$, as it allows the honest voters $V_i$ the ability to cast their vote with a tag uncorrelated to that of other voters or one that is chosen by the tallyman.

Lastly, even with complete knowledge of x, the tallyman T cannot distinguish one announcement from the other since the tallyman does not know which edge corresponds to which voter (with guessing advantage more than $\gamma$). This is accomplished via the use of Algorithm S.2. To show this, the loss of anonymity from multiple runs of Algorithm S.2 is bounded. Specifically, given the required number of GHZ states, let the minimum starting fidelity of a Bell state be $$F_{min}^0 = 1 - \epsilon \qquad \text{Equation S.95}$$

for some $\epsilon > 0$. With this assumption, purification protocol for r rounds can be applied. This will increase the fidelity to, $$F_{min}^r = \frac{1}{p_{suc}} \cdot \left( \left( F_{min}^{r-1} \right)^2 + \left( \frac{1 - F_{min}^{r-1}}{3} \right)^2 \right), \qquad \text{Equation S.96}$$

where $$F_{min}^r$$

is the minimum fidelity across all Bell states after r rounds of purification, and, $$p_{suc} = \left( F_{min}^{r-1} \right)^2 + \frac{2}{3} F_{min}^{r-1} \left( 1 - F_{min}^{r-1} \right) + \frac{5}{9} \left( 1 - F_{min}^{r-1} \right)^2 \qquad \text{Equation S.97}$$

where $p_{suc}$ denotes the probability that the purification succeeds. By a Taylor expansion of Equation S.96 using Equation S.95, the following can be obtained $$F_{min}^1 = 1 - \frac{2}{3}\epsilon - \frac{2}{3}\epsilon^2 + O(\epsilon^3) \approx 1 - \frac{2}{3}\epsilon = \frac{1}{3}\left(1 + 2F_{min}^0\right) \qquad \text{Equation S.98}$$

After some algebra, this yields that, $$F_{min}^r = \frac{1}{3^r}(c_r + 2^r \cdot F_{min}^0) \qquad \text{Equation S.99}$$

where $c_1=1$ and, $$c_r = 3^{r-1} + 2 \cdot c_{r-1} = 3^r - 2^r. \qquad \text{Equation S.100}$$

This allows us to further simplify Equation S.99 to its final form as, $$F_{min}^r = \frac{1}{3^r}(3^r - 2^r(1 - F_{min}^0)) = 1 - \left(\frac{2}{3}\right)^r \epsilon. \qquad \text{Equation S.101}$$

Algorithm S.2 consumes $O(N)$ GHZ states to anonymously transfer 1 qubit and is repeated $O(N \log N)$ times for every run of $\Pi_{vote}$, thereby using $O(N^2 \log N)$ GHZ states in total. Additionally, $\Pi_{vote}$ itself is repeated $O(N)$ times, bringing the total number of GHZ states that need to be purified to $O(N^3 \log N)$. Note that a GHZ state can be created from N Bell states with no more than $O(N)$ loss of fidelity, assuming perfect gates in the circuit. Such a circuit implementation has been proposed for the aforementioned GHZ state preparation. Therefore, by a union bound on Lemma S.1, it can be seen that the total loss of anonymity is, anonymity leak$\leq \epsilon' \cdot O(N^4 \log N)$, where, $\epsilon'$ is the desired fidelity to have $\gamma$-anonymity. To ensure this, the anonymity leak is upper bounded by $\gamma$, anonymity leak$\leq \epsilon' \cdot O(N^4 \log N) = \gamma$. \qquad Equation S.102

Using Equation S.101 and the fact that the desired final fidelity by Equation.S102 is, $$1 - \left(\frac{2}{3}\right)^r \epsilon = F_{min}^r = \sqrt{1 - \frac{\gamma^2}{N^8 \log^2 N}},$$

the following is the bound on the number of rounds r required in the purification process, $$r = \log\left(\frac{4\epsilon}{3\gamma^2} \cdot N^8 \log^2 N\right). \qquad \text{Equation S.103}$$

Now, because the protocol is a recurrence protocol, the number of expected Bell states required to purify one GHZ state to the desired degree of fidelity is $O(2^r)$. This yields, $$\text{\# Bell states} = O\left(2^{\log\left(\frac{4\epsilon}{3\gamma^2} \cdot N^8 \log^2 N\right)}\right) = O\left(\frac{4\epsilon}{3\gamma^2} N^8 \log^2 N\right) \qquad \text{Equation S.104}$$

This can be repeated for all $O(N^3 \log N)$ GHZ states that will be used in the repetitions of $\Pi_{vote}$.

a Variant of the Voting Scheme

The following description includes a variant of the voting scheme. It enables savings in quantum communication (Theorem S.4) but requires a more involved security analysis of anonymity.

Each of t tallymen may send s extra copies of the ballot state to each voter, introducing a tag consisting of random pairs of bits and their parities (FIG. 1):

$$(((i_1,j_1),p_{i_1}j_{j_1}), \ldots, ((i_s,j_s),p_{i_s}j_{j_s})) \subset [n]^2 \times \{0,1\} \qquad \text{Equation S.105}$$

For the vote to be counted, the tag has to be correct. Extending Equation S.67, the probability to pass authentication without access to the ballot states is exponentially small in the length of the tag:

$$Pr[(N' - N) \text{ votes}] \leq \frac{1}{2^{st}} \frac{1}{2^{N'-N}} \qquad \text{Equation S.106}$$

This feature prevents attacks where unverified adversaries attempt to force the protocol to abort. With tags from multiple tallymen, it forces them to cooperate to verify votes. The resource consumption becomes $O(stN \log(sN))$, times a factor of $O((stN)^2)$ for anonymous transmission. For security, the number of copies in the tag is $s=O(\log N)$ (Theorem S.5). The number of tallymen t can be some constant greater than one to compare outcomes.

Theorem S.4. $\forall \delta' > 0$, given $s=O(\log N)$ copies of $|\psi_x\rangle$, $Pr[N'>N''\{\text{votes are counted}\}] \leq \delta'$ Proof. Given s additional copies of the ballot state per voting ballot, the probability of casting adversarial votes is suppressed by a factor $1/2^s$. Extending the reasoning of Theorem S.2, each voter has $O(sN)$ such attempts, by Lemma S.2. To limit the influence on the $\epsilon$ across all voters, $$\frac{sN}{2^s} \leq \frac{1}{N}. \qquad \text{Equation S.107}$$

Then, $2^s/s \geq N^2$, so asymptotically, a tag of length $s=O(\log N)$ suffices.

Figure 9:
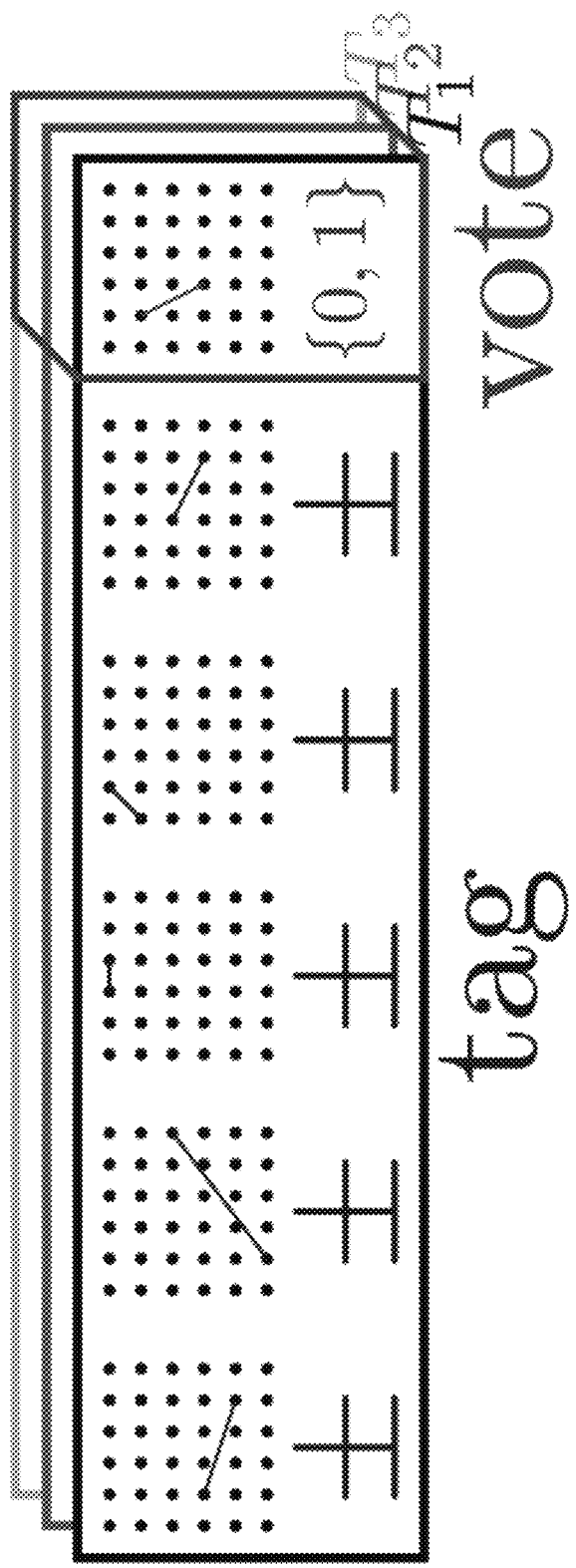
FIG. 9 is a diagram of an example illustrating embodiments in which voters receive several copies of the ballot state from multiple tallymen.

Referring to FIG. 9, In some embodiments, to amplify security, voters receive several copies of the ballot state from multiple tallymen. A vote is valid if the additional parities are correct. The outcomes from multiple tallymen are compared to suppress cheating.

Figure 10:
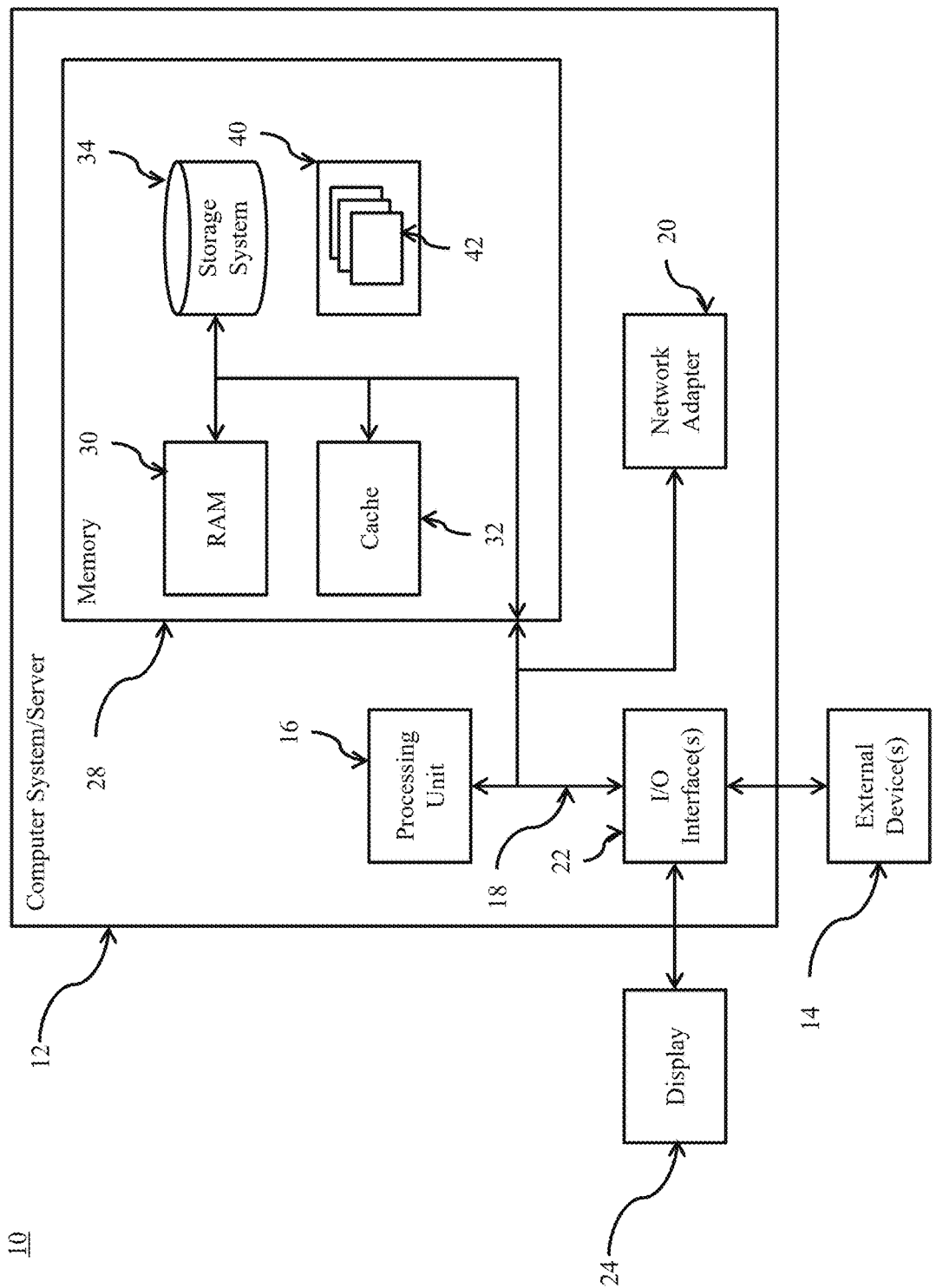
FIG. 10 depicts a computing node according to embodiments of the present disclosure.

Referring now to FIG. 10, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a quantum node refers to a node in a quantum network. A quantum node has a quantum memory that can robustly store qubit states. In addition, it is possible to process quantum information within a quantum node. In embodiments employing a fiber network, a quantum nodes can communicate via fibres.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of conducting a vote using a quantum network, the method comprising:
   by a tally quantum node, generating a first plurality of ballot quantum states encoding a first bit string, each of the first plurality of ballot quantum states comprising a plurality of qubits;
   distributing each of the first plurality of ballot quantum states to exactly one of a plurality of voter quantum nodes via a quantum network;
   by at least one of the plurality of voter quantum nodes:
      performing a projective measurement of the respective one of the first plurality of ballot quantum states for each voter quantum node of the at least one of the plurality of voter quantum nodes, and thereby determining a parity of a random pair of bits of the first bit string;
      reading a vote;
      computing a first encoded vote based on the parity and the vote; and
      broadcasting the first encoded vote and an identifier of the pair of bits to each other of the plurality of voter quantum nodes; and
   providing the first bit string to decode the first encoded vote.

2. The method of claim 1, further comprising:
   based on the first bit string and the identifier, decoding the first encoded vote to determine a first decoded vote; and
   tallying the first decoded vote.

3. The method of claim 2, further comprising outputting a result to a user according to the tally.

4. The method of claim 1, wherein each of the plurality of voter quantum nodes:
   performs a projective measurement of the respective one of the first plurality of ballot quantum states for each voter quantum node of the plurality of voter quantum nodes, and thereby determines a parity of a random pair of bits of the first bit string;
   receives a vote;
   computes a first encoded vote based on the parity and the vote;
   broadcasts the first encoded vote and an identifier of the pair of bits to each other of the plurality of voter quantum nodes.

5. The method of claim 1, further comprising:
generating a second plurality of ballot quantum states encoding a second bit string, each of the second plurality of ballot quantum states comprising a plurality of qubits;
distributing each of the second plurality of ballot quantum states to exactly one of the plurality of voter quantum nodes via the quantum network;
by at least one of the plurality of voter quantum nodes:
performing a projective measurement of the respective one of the second plurality of ballot quantum states for each voter quantum node of the at least one of the plurality of voter quantum nodes, and thereby determining a parity of a random pair of bits of the second bit string;
computing a second encoded vote based on the parity and the vote;
broadcasting the second encoded vote and an identifier of the pair of bits to each other of the plurality of voter quantum nodes;
providing the second bit string to decode the second encoded vote.

6. The method of claim 5, further comprising:
averaging the first and second encoded votes to determine the vote.

7. The method of claim 1, wherein the each of the first plurality of ballot quantum states is given by:

$$\frac{1}{\sqrt{n}} \sum_{i=0}^{n-1} (-1)^{x_i} |i\rangle$$

wherein the first bit string has n bits and the $x_i$ denotes the $i^{th}$ bit in the first bit string.

8. The method of claim 1, wherein the quantum network is an optical fiber network.

9. The method of claim 1, wherein the plurality of qubits of each of the first plurality of ballot quantum states are photons.

10. The method of claim 1, further comprising:
generating the first bit string randomly.

11. The method of claim 1, further comprising:
preparing a shared Greenberger-Horne-Zeilinger state among the tally quantum node and the plurality of voter quantum nodes.

12. The method of claim 11, wherein preparing the shared Greenberger-Horne-Zeilinger state comprises:
distributing a ring of Bell pairs connecting the tally quantum node and the plurality of voter quantum nodes in a ring.

13. The method of claim 11, wherein distributing each of the first plurality of ballot quantum states comprises:
from the shared Greenberger-Horne-Zeilinger state, distilling at least one Bell pair between the tally quantum node and each of the plurality of voter quantum nodes.

14. The method of claim 11, wherein the first encoded vote and the identifier of the pair of bits are broadcast via the shared Greenberger-Horne-Zeilinger state.

15. The method of claim 11, further comprising:
the first encoded vote and the identifier of the pair of bits are broadcast via the shared Greenberger-Horne-Zeilinger state.

16. The method of claim 11, further comprising:
broadcasting by at least one of the plurality of quantum nodes a complaint bit via the GHZ state;
tallying the complaint bit by computing a multiparty secure sum on the GHZ state.

17. The method of claim 1, wherein computing the first encoded vote comprises adding the parity and the vote modulo 2.

18. The method of claim 1, further comprising:
forming an anonymous queue of the plurality of the plurality of voter quantum nodes,
wherein the first plurality of ballot quantum states are distributed in order of the anonymous queue.

19. The method of claim 18, wherein forming the anonymous queue comprises:
preparing a shared Greenberger-Horne-Zeilinger state among the tally quantum node and the plurality of voter quantum nodes;
each of the plurality of voter quantum nodes broadcasting a queue entry request via the shared Greenberger-Horne-Zeilinger state;
each of the plurality of voter quantum nodes detecting a successful queue entry request by computing a multiparty secure sum.

20. The method of claim 18, wherein the first encoded vote is broadcast in queue order.

21. The method of claim 1, wherein reading the vote comprises receiving a user input.

22. A method of casting a vote using a quantum network, the method comprising:
receiving, at a first voter quantum node of a plurality of voter quantum nodes, a ballot quantum state via a quantum network, the ballot quantum state encoding a first bit string in a plurality of qubits;
performing a projective measurement of the ballot quantum state, and thereby determining a parity of a random pair of bits of the first bit string;
reading a vote;
computing a first encoded vote based on the parity and the vote; and
broadcasting, by the first voter quantum node, the first encoded vote and an identifier of the pair of bits to each other of the plurality of voter quantum nodes.

23. A method of tallying a vote using a quantum network, the method comprising:
receiving a plurality of encoded votes, each with an associated identifier, wherein
each associated identifier identifies a pair of bits randomly selected from a predetermined bit string, and
each encoded vote is based on a vote and a parity, the parity being based on a projective measurement of a ballot quantum state encoding the predetermined bit string;
receiving the predetermined bit string;
based on the predetermined bit string and the associated identifiers, decoding the plurality of encoded votes; and
tallying the plurality of decoded votes.

24. A system comprising:
a quantum network;
a tally quantum node operatively coupled to the quantum network; and
a plurality of voter quantum nodes operatively coupled to the quantum network, wherein:
the tally quantum node is configured to:
generate a first plurality of ballot quantum states encoding a first bit string, each of the first plurality of ballot quantum states comprising a plurality of qubits; and
distribute each of the first plurality of ballot quantum states to exactly one of the plurality of voter quantum nodes via the quantum network; and each of the plurality of voter quantum nodes is configured to:
perform a projective measurement of the respective one of the first plurality of ballot quantum states for that voter quantum node, and thereby determining a parity of a random pair of bits of the first bit string;
read a vote;
compute a first encoded vote based on the parity and the vote; and
broadcast the first encoded vote and an identifier of the pair of bits to each other of the plurality of voter quantum nodes via the quantum network.

* * * * *